(12) United States Patent
Sloan

(10) Patent No.: US 12,011,407 B2
(45) Date of Patent: *Jun. 18, 2024

(54) AUTOMATED GENERATION OF CONTROL SIGNALS FOR SEXUAL STIMULATION DEVICES

(71) Applicant: Brian Sloan, Mercer Island, WA (US)

(72) Inventor: Brian Sloan, Mercer Island, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/324,983

(22) Filed: May 28, 2023

(65) Prior Publication Data

US 2023/0277409 A1  Sep. 7, 2023

Related U.S. Application Data

(63) Continuation of application No. 17/970,299, filed on Oct. 20, 2022, now Pat. No. 11,717,467, which is a continuation of application No. 17/534,155, filed on Nov. 23, 2021, now Pat. No. 11,478,398, which is a continuation of application No. 16/861,014, filed on Apr. 28, 2020, now Pat. No. 11,185,465, which is a continuation-in-part of application No. 16/214,030, filed on Dec. 7, 2018, now Pat. No. 10,638,174, which is a continuation-in-part of application No.

(Continued)

(51) Int. Cl.
| | |
|---|---|
| *A61H 19/00* | (2006.01) |
| *G06F 16/783* | (2019.01) |
| *G06N 20/00* | (2019.01) |
| *H04N 21/234* | (2011.01) |
| *H04N 21/2387* | (2011.01) |
| *H04N 21/242* | (2011.01) |

(52) U.S. Cl.
CPC ............. *A61H 19/00* (2013.01); *A61H 19/32* (2013.01); *G06F 16/783* (2019.01); *G06N 20/00* (2019.01); *H04N 21/23418* (2013.01); *H04N 21/2387* (2013.01); *H04N 21/242* (2013.01); *A61H 2201/501* (2013.01); *A61H 2201/5058* (2013.01); *A61H 2230/825* (2013.01)

(58) Field of Classification Search
CPC ................... A61H 19/00; A61H 19/32; A61H 2201/5023; A61H 2201/501; A61H 2205/087; H04N 21/23418; H04N 21/2387

See application file for complete search history.

(56) References Cited

U.S. PATENT DOCUMENTS 11,717,467 B2 *  8/2023  Sloan .................... G06N 20/00
                                                 600/38
2019/0163274 A1  5/2019  Sun et al.

FOREIGN PATENT DOCUMENTS

WO    2020183032 A1    9/2020

* cited by examiner

*Primary Examiner* — Christine H Matthews
(74) *Attorney, Agent, or Firm* — Boon Intellectual Property Law, PLLC; Brian S. Boon

(57) ABSTRACT

A system and method for controlling the speed of operation of sexual stimulation devices from videos of sexual activity using a less computationally intensive method of estimating movement speed from a video. In an embodiment, the system and method involve estimating movement in a video using pixel-by-pixel color change over time, calculating a rate of color change in the video, estimating a speed of movement in the video from the rate of color change, and applying an algorithm to convert the estimated speed of movement in the video to a speed of operation of a sexual stimulation device.

8 Claims, 24 Drawing Sheets

Related U.S. Application Data

16/139,550, filed on Sep. 24, 2018, now Pat. No. 10,576,013.

(60) Provisional application No. 63/414,417, filed on Oct. 7, 2022.

US 12,011,407 B2

AUTOMATED GENERATION OF CONTROL SIGNALS FOR SEXUAL STIMULATION DEVICES

CROSS-REFERENCE TO RELATED APPLICATIONS

Priority is claimed in the application data sheet to the following patents or patent applications, each of which is expressly incorporated herein by reference in its entirety:
Ser. No. 17/970,299
Ser. No. 63/414,417
Ser. No. 17/534,155
Ser. No. 16/861,014
Ser. No. 16/214,030
Ser. No. 16/139,550

BACKGROUND OF THE INVENTION

Field of the Art

The present invention is in the field of computer control systems, and more specifically the field of control systems for sexual stimulation devices.

Discussion of the State of the Art

In the field of sexual stimulation devices, there are examples of control systems that allow for synchronization of the device with videos of sexual activity. However, existing systems are extremely limited in their functionality. They contain only limited libraries of manually pre-programmed synchronized stimulation routines, cannot recognize video content on their own, cannot automatically create their own stimulation routines, and cannot customize the experience for the user using biometric data about the user. Further, existing algorithms for controlling the speed of stimulation are complicated and computationally intensive.

What is needed is a system and method for controlling the speed of operation of sexual stimulation devices from videos of sexual activity using a less computationally intensive method of estimating movement speed from a video.

SUMMARY OF THE INVENTION

Accordingly, the inventor has conceived, and reduced to practice, a system and method for controlling the speed of operation of sexual stimulation devices from videos of sexual activity using a less computationally intensive method of estimating movement speed from a video. In an embodiment, the system and method involve estimating movement in a video using pixel-by-pixel color change over time, calculating a rate of color change in the video, estimating a speed of movement in the video from the rate of color change, and applying an algorithm to convert the estimated speed of movement in the video to a speed of operation of a sexual stimulation device.

According to a preferred embodiment, a system for automated generation of control signals for sexual stimulation devices from videos of sexual activity is disclosed, comprising: a computing device comprising a memory and a processor; a video analysis engine comprising a first plurality of programming instructions stored in the memory which, when operating on the processor, causes the computing device to: determine, for each frame in a sequence, a color for each pixel of the frame and for each corresponding pixel of the next frame in the sequence; determine a color distance between each pixel of the frame and the corresponding pixel of the next frame in the sequence; and calculate a pixel color change percentage as a percentage of the number of pixels in the frame that differ from the corresponding pixels in the next frame; estimate a first speed of movement as a function of the pixel color changes over a time window; and a control signal generator comprising a second plurality of programming instructions stored in the memory which, when operating on the processor, causes the computing device to generate a control signal for a sexual stimulation device which instructs the sexual stimulation device to operate at a second speed that is calculated based on the first speed and the operational characteristics of the sexual stimulation device.

According to another preferred embodiment, a method for automated generation of control signals for sexual stimulation devices from videos of sexual activity is disclosed, comprising the steps of: using a video analysis engine operating on a computing device comprising a memory and a processor to: determine, for each frame in a sequence, a color for each pixel of the frame and for each corresponding pixel of the next frame in the sequence; determine a color distance between each pixel of the frame and the corresponding pixel of the next frame in the sequence; and calculate a pixel color change percentage as a percentage of the number of pixels in the frame that differ from the corresponding pixels in the next frame; estimate a first speed of movement as a function of the pixel color changes over a time window; and using a control signal generator operating on the computing device to generate a control signal for a sexual stimulation device which instructs the sexual stimulation device to operate at a second speed that is calculated based on the first speed and the operational characteristics of the sexual stimulation device.

According to an aspect of an embodiment, a color distance threshold is used to calculate the pixel color change percentage.

According to an aspect of an embodiment, the video analysis engine is further configured to receive a video comprising a plurality of frames in the sequence.

According to an aspect of an embodiment, the first speed of movement is associated with movement in the video.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

DETAILED DESCRIPTION OF THE DRAWING FIGURE

Figure 1:
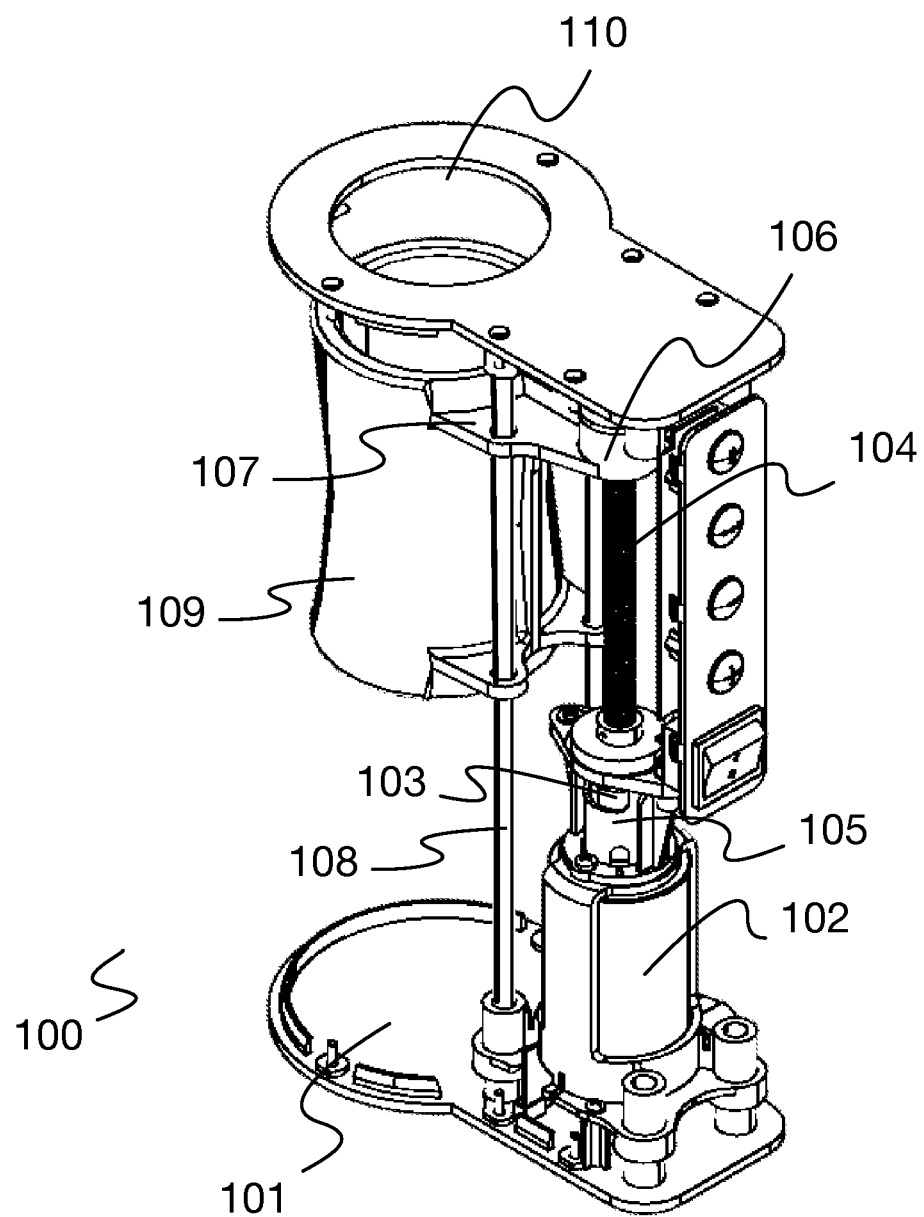
FIG. 1 shows the internal workings of an exemplary sexual stimulation device.

The inventor has conceived, and reduced to practice, a system and method for controlling the speed of operation of sexual stimulation devices from videos of sexual activity using a less computationally intensive method of estimating movement speed from a video. In an embodiment, the system and method involve estimating movement in a video using pixel-by-pixel color change over time, calculating a rate of color change in the video, estimating a speed of movement in the video from the rate of color change, and applying an algorithm to convert the estimated speed of movement in the video to a speed of operation of a sexual stimulation device. The methodology described herein is advantageous in that it requires less processing power than other methods, allowing for use of the system and method on mobile computing devices such as smartphones, tablets, etc., rather than desktop or server-type computers.

In the field of sexual stimulation devices, there are examples of control systems for such devices that allow for synchronization of the device with videos of sexual activity. These control systems attempt to replicate the sexual activities shown on the screen through synchronization of the video with some form of sexual stimulation device. However, existing systems cannot synchronize with any video of sexual activity. They must be manually pre-programmed for each video. As a result, they contain only limited libraries of video-synchronized stimulation routines. Further, since they are manually pre-programmed, the experience is the same for every user, and cannot be customized to the user's preferences or biometric data. As a result, such systems cannot accurately imitate the sensations shown in the video for many or most users, and cannot customize the experience for the user using biometric data about the user such as differences in anatomy. There are numerous improvements of this invention over the prior art, such as automated real time video analysis and synchronization, modeling of "typical" or "representative" sexual activity from one or more videos, and broad customization of the user experience based on user preferences and the user's biometric data.

This control system uses automated, real-time video analysis and machine learning algorithms to identify components of the sexual activity in the video such as movement, pressure, and rhythm, as opposed to existing systems which require manually pre-programming the controller to match the perceived activity in the videos. Using real-time video analysis allows access to the entirety of sexual video content available on the internet. Any video containing sexual content could be used with the system, which allows the user to choose videos with very specific content based on the user's preferences.

Since any video containing sexual content can be used, the system can be tuned to mimic the sexual activity of particular actors or actresses engaging in specific sexual activities. The machine learning algorithms used to conduct the video analysis could be fed metadata about the videos such as the names of the actor or actress, such that the control system could learn to "perform" certain sexual activities just like a certain actor or actress does generally, or even in a particular film. Likewise, since any video can be used with this control system, and since the synchronization with the videos can be either automated or controlled by the user, the opportunities for customization and sharing are unlimited. Users would have the opportunity to customize the stimulation associated with videos in myriad ways, and share those customized experiences with others by sharing the control system file associated with that video. Further, users could create videos of their own sexual activity, and "share" their experience with others remotely through this control system and an appropriate stimulation device.

Another major benefit of this control system is the broad customization allowed based on user profiles. At the most basic level, users can simply watch a video, and allow the system to control the device based on the system's automated video parsing without any adjustment or input. However, the system is not limited to such usage. The system could be used with a manual form of input such as a slider bar on the screen, which allows users to map their own perception of the movement and sexual activity in the video.

The system could allow users to set up a profile containing parameters and preferences for operation of the compatible sexual stimulation device. For example, the user could set a parameter indicating that the device should speed up or slow down when certain movements in the video are detected. Further, combining these parameters with biometric sensor data could allow the user to indicate that the device should attempt to prolong orgasm for a certain period of time. For example, the user could set a parameter indicating that orgasm should be delayed at least 15 minutes, and this parameter, combined with biometric data of breathing rate, heart rate, penile stiffness, etc., could cause the control system to slow down or stop stimulation until the biometric data falls back within certain ranges, at which point the device would continue stimulation as usual. A myriad of parameters, preferences, and biometric data ranges could be used. For example, the control system could be instructed to delay orgasm, prevent orgasm, or hold the user at a given level of excitement.

Further, metadata can be captured from the video related to the video content including, for example, the actor or actress in the video, the type of sexual activity, the position or orientation of the sexual activity, the location or scene in which the sexual activity occurs, and the style or category of the video content (e.g., oral sex, anal sex, gay sex, fetish). Using metadata associated with the videos, the control system could select or suggest videos containing very specific content based on the user's preferences. Such metadata may already be embedded in the videos, may be available on the internet, or may be developed by having users input such metadata in a growing library of such videos. Further, biometric data, for example penis length and girth for males, can be entered into the user profile, and the stimulation provided by the control system can be automatically adjusted to provide the user a customized, better feeling, more realistic experience based on those dimensions. For females, the amount of vaginal secretions could be measured using sensors on a compatible device, and the compatible device's operation could be adjusted accordingly. Optionally, other types of biometric data such as heart rate, breathing rate, and penile stiffness could be captured by a variety of commercially available devices (for example, sports training monitors), or by sensors on the stimulation device, itself, and fed back to the user profile to automatically optimize the video content and types of stimulation preferred by the user.

The process of training the machine learning algorithms used by the control system could be aided by a number of means. For example, users could manually tag a small subset of videos with synchronized stimulation routines, which could then be applied by the machine learning algorithms to very large databases of videos to learn which videos contain that sort of sexual activity. Clustering could be used to identify certain types of sexual activity, based on the movement and rhythm associated with them, and pressure can be extrapolated from smaller sets of manually tagged videos. User ratings in some portal or online platform could help refine the outputs and extrapolations generated by the machine learning algorithms.

In some embodiments, all components of the video control system may be located on a general-purpose computer. In other embodiments, some components of the video control system may be located on the compatible stimulation device as embedded computer components or systems. For example, a compatible stimulation device may contain an embedded computer component or systems that act as the device controller, which receives signals from a video analysis engine and causes the compatible stimulation device to operate in accordance with those signals. In some aspects of some embodiments, such an embedded computer component or system might contain programmed sequences of movements or other content such that the bandwidth required to transmit signals to the device can be reduced by sending references to the programmed sequences of movements.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Conceptual Architecture

Figure 7:
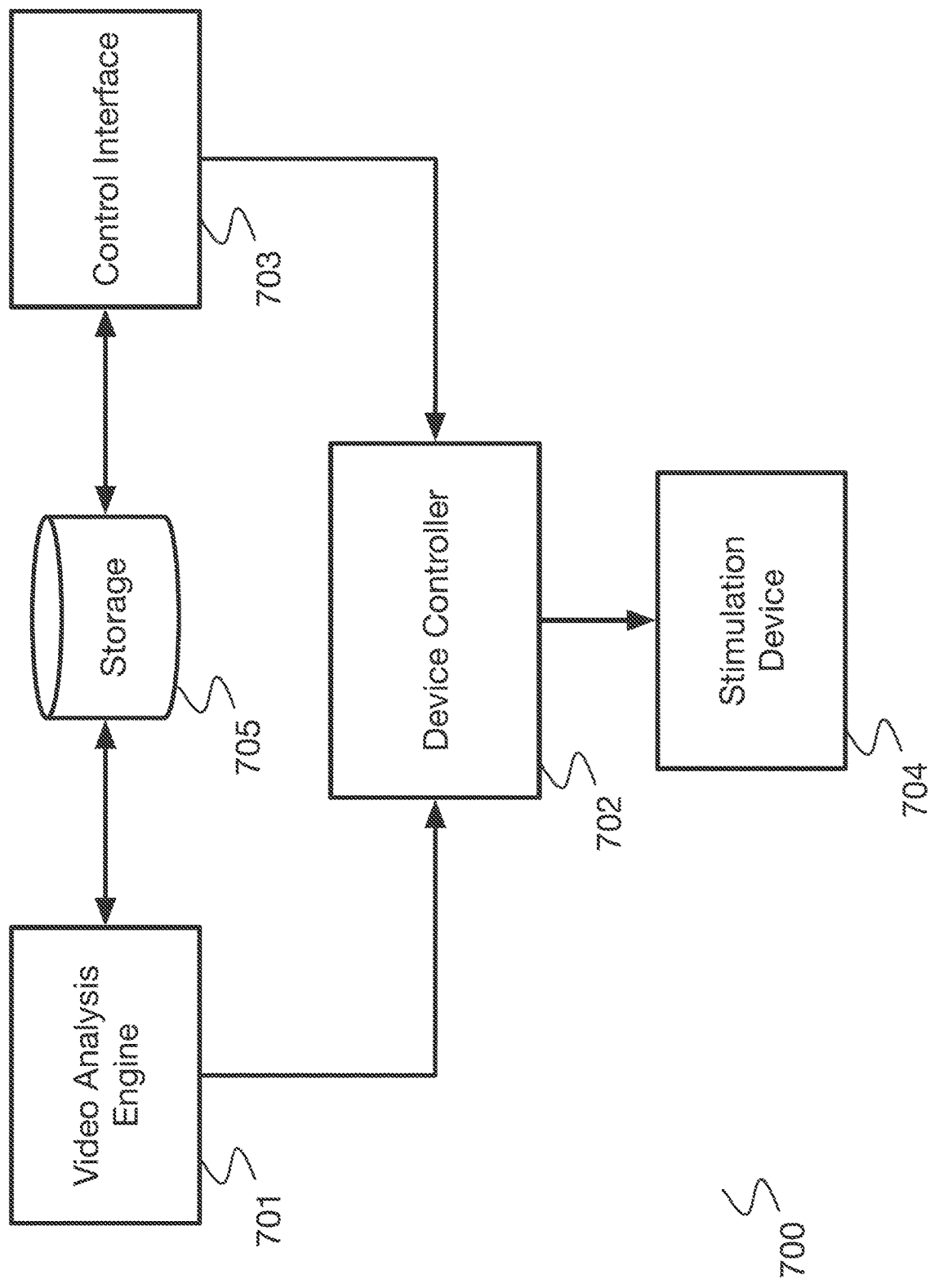
FIG. 7 is a block diagram of an exemplary synchronized video control system for sexual stimulation devices.

FIG. 7 is a block diagram of an exemplary synchronized video control system for sexual stimulation devices 700. In this embodiment, a video analysis engine 701 inputs a video of sexual activity, parses the video into at least the components of movement corresponding to the sexual activity shown in the video, and outputs signals containing the parsed video information to a device controller 702. A control interface 703 allows the user to enter a profile containing parameters for sexual stimulation device operation or the user's biometric information, stores the user's profile information, and outputs the user's profile information to the device controller 702. The device controller 702 adjusts the signals from the video analysis engine 701 based on the profile information from the control interface 703 and outputs the adjusted signals to a stimulation device 704 such that they are synchronized with the activity shown in the video. In an aspect of an embodiment, the parsed video information from the video analysis engine 701 is stored in a data storage device 705 for later retrieval and use.

Figure 8:
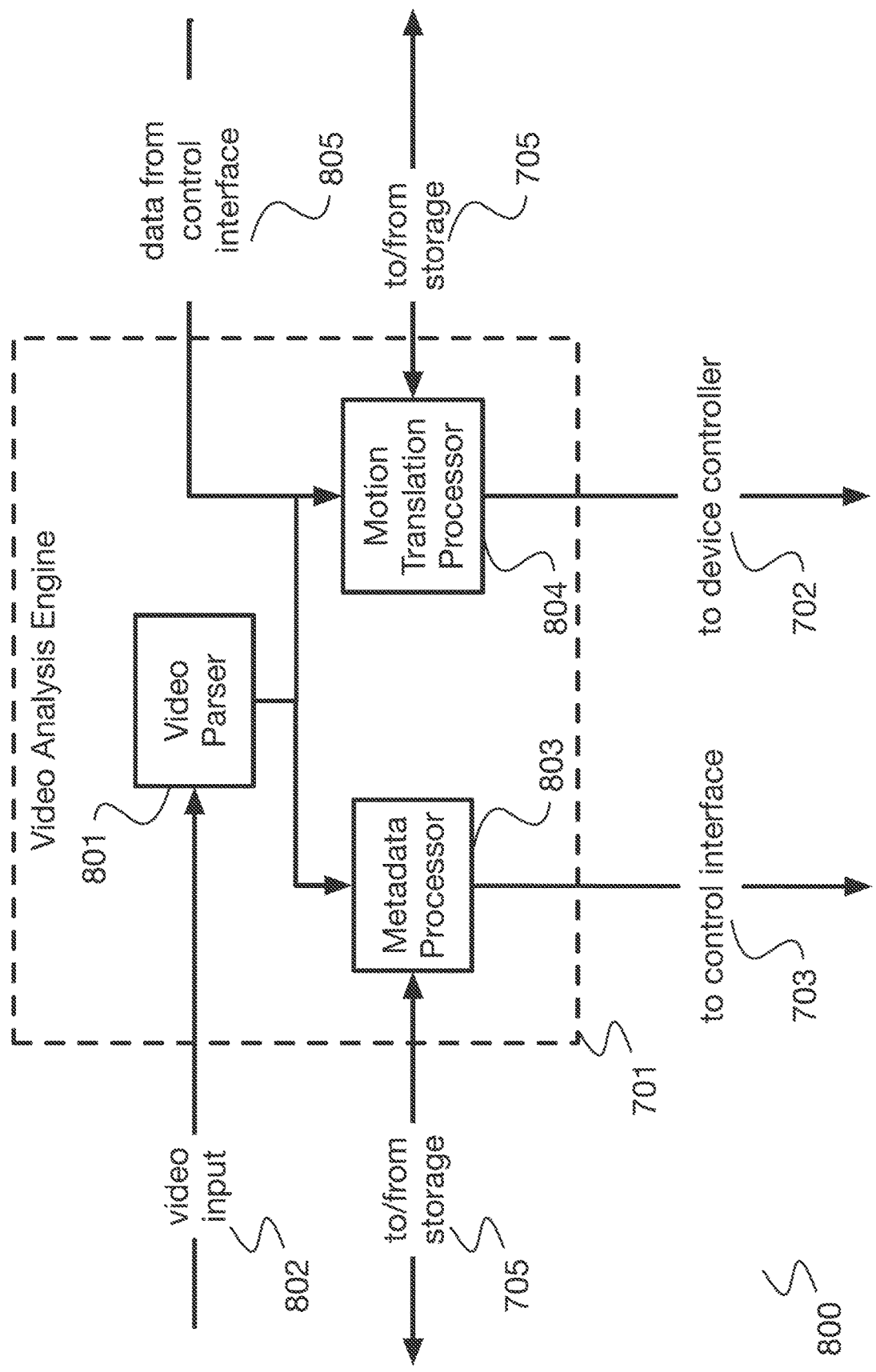
FIG. 8 is a block diagram of the video analysis engine aspect of an exemplary synchronized video control system for sexual stimulation devices.

FIG. 8 is a block diagram 800 the video analysis engine 701 aspect of an exemplary synchronized video control system for sexual stimulation devices. A video parser 801 receives video input 802, sends the video's metadata to a metadata processor 803, which checks to see if the metadata for that video already exists in the data storage device 705. If the metadata already exists, it is read from the data storage device 705 and sent out the control interface 703. If the metadata does not exist, it is formatted, written to the data storage device 705, and sent out to the control interface 703. Simultaneously, the video parser 801 sends the video content to the motion translation processor 804, which checks to see if the control signal data for that video already exists in the data storage device 705. If the control signal data already exists, it is read from the data storage device 705 and sent out the device controller 702. If the control signals do not exist, the motion translation processor 804 uses video processing algorithms and machine learning algorithms to detect sexual activity and to translate the motions in the video to control signals related to movement, pressure, and rhythm, and makes adjustments to the control signals in response to data from the control interface 805. The controls signals are then written to the data storage device 705 and sent out to the device controller 702. In an aspect of an embodiment, the actual video content may also be stored in the data storage device 705.

Figure 9:
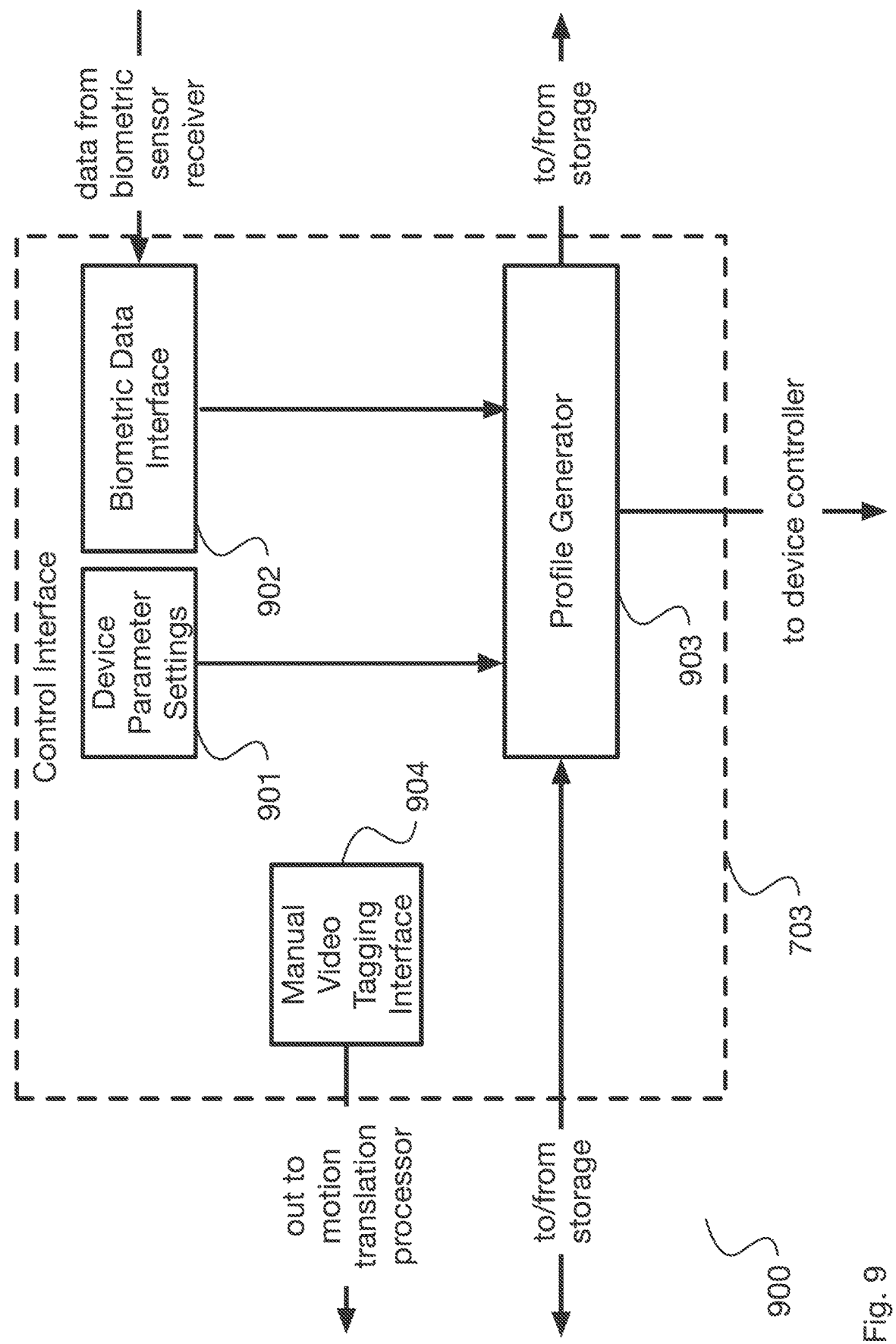
FIG. 9 is a block diagram of the control interface aspect of an exemplary synchronized video control system for sexual stimulation devices.

FIG. 9 is a block diagram 900 of the control interface 703 aspect of an exemplary synchronized video control system for sexual stimulation devices. The user can enter device parameter settings 901 to adjust operation of a compatible device. The user can further enter biometric data manually, or it may be obtained automatically by the biometric data interface 902 from biometric sensor receiver 1004 disclosed in FIG. 10. The parameters and biometric data are sent to a profile generator 903, which creates a profile for the user based on the various inputs. The profile information is saved to the storage device 705, and is sent to the device controller 702. The control interface may contain a manual video tagging interface 904, which allows the user to adjust the sensations received while viewing those videos.

Figure 10:
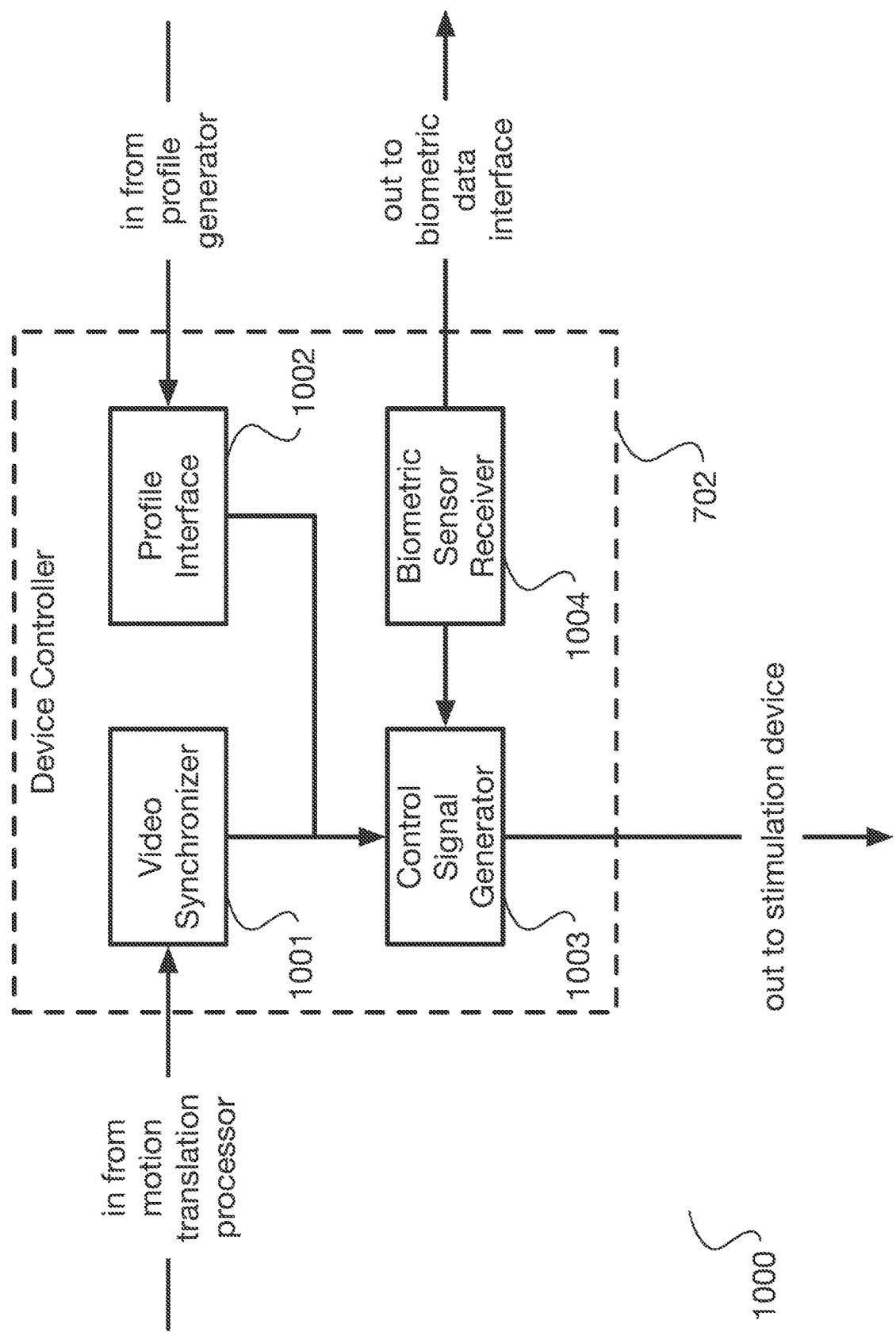
FIG. 10 is a block diagram of the device controller aspect of an exemplary synchronized video control system for sexual stimulation devices.

FIG. 10 is a block diagram 1000 of the device controller 702 aspect of an exemplary synchronized video control system for sexual stimulation devices. Control signals for the video being watched are received from the motion translation processor 804 into the video synchronizer 1001, which adjusts the timing of the signals to correspond with the video being watched. Parameters and biometric data are received into the profile interface 1002 from the profile generator 903. A control signal generator 1003 receives the outputs from both the video synchronizer 1001 and profile interface 1002, and adjusts the synchronized control signals based on the parameters and biometric data, and sends out the adjusted control signal to the stimulation device 704. The device controller may also contain a biometric sensor receiver 1004 that could allow the capture of biometric data from wireless devices such as fitness trackers that monitor heart rate, blood pressure and breathing monitors, and even sensors in the stimulation device itself. The data captured through the biometric sensor receiver could be used for real time feedback to the control signal generator 1003 and for use in improving user experiences by enhancing the user's profile or improving the accuracy of video selection.

Figure 11:
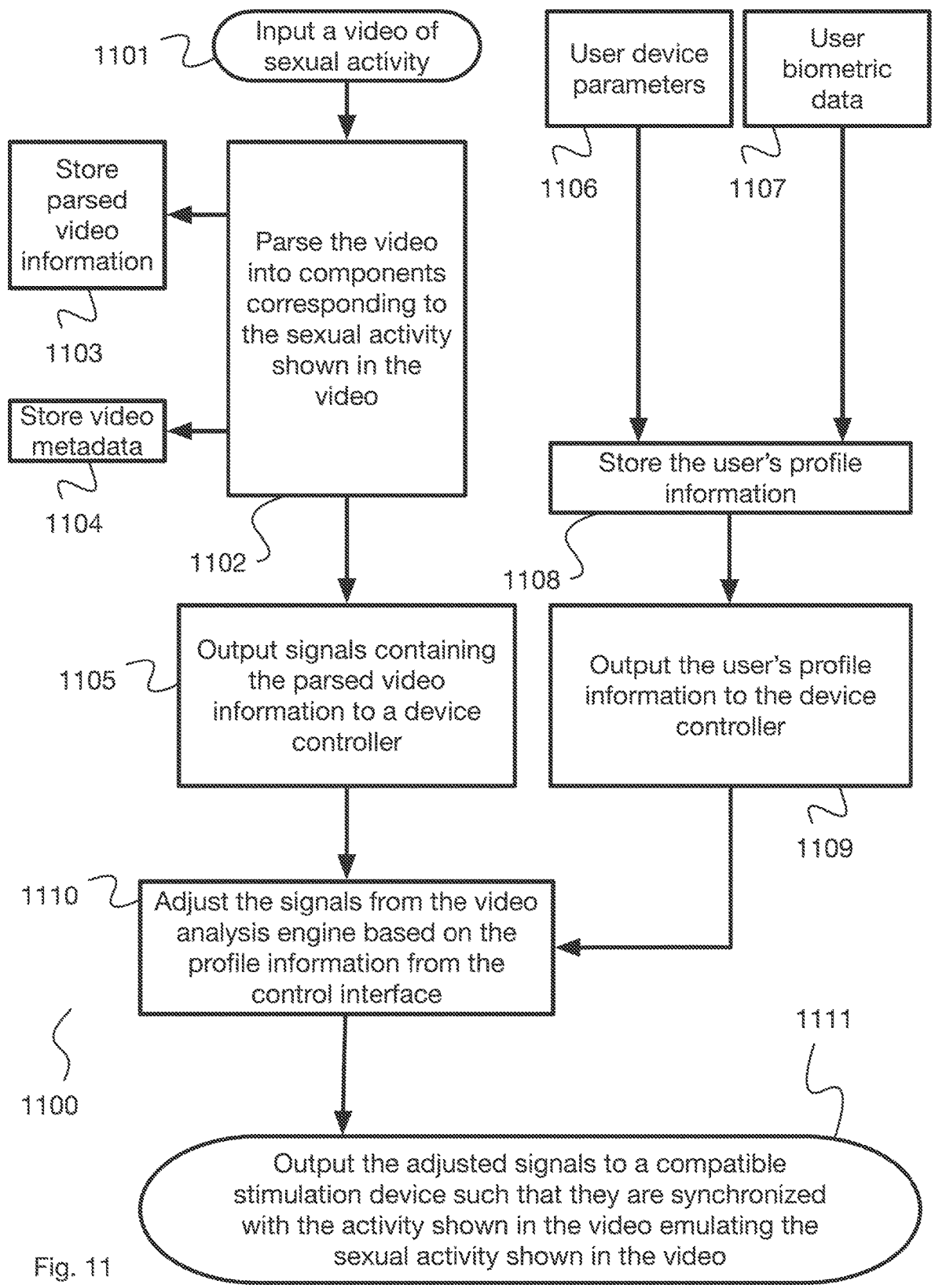
FIG. 11 is a flow diagram showing a method for an exemplary synchronized video control system for sexual stimulation devices.

FIG. 11 is a flow diagram showing a method 1100 for an exemplary synchronized video control system for sexual stimulation devices. According to this method, video of sexual activity would be input into a computer 1101. The computer, using machine learning algorithms, would parse the video into at least one component corresponding to the sexual activity shown in the video 1102. The parsed video information could be stored for later retrieval 1103 and any video metadata could also be stored for later retrieval 1104. Signals containing the parsed video information to a device controller would be output to a device controller 1105. Separately, the user would be allowed to enter a profile in a control interface containing at least parameters for adjusting compatible device operation 1106, and biometric data 1107, which would be stored 1108, and output to the device controller 1109. The signals from the parsed video would be adjusted based on the user's profile information 1110 and output to a compatible device, synchronized with the activity shown in the video, such that the compatible device would emulate the sexual activity shown in the video 1111.

Figure 12:
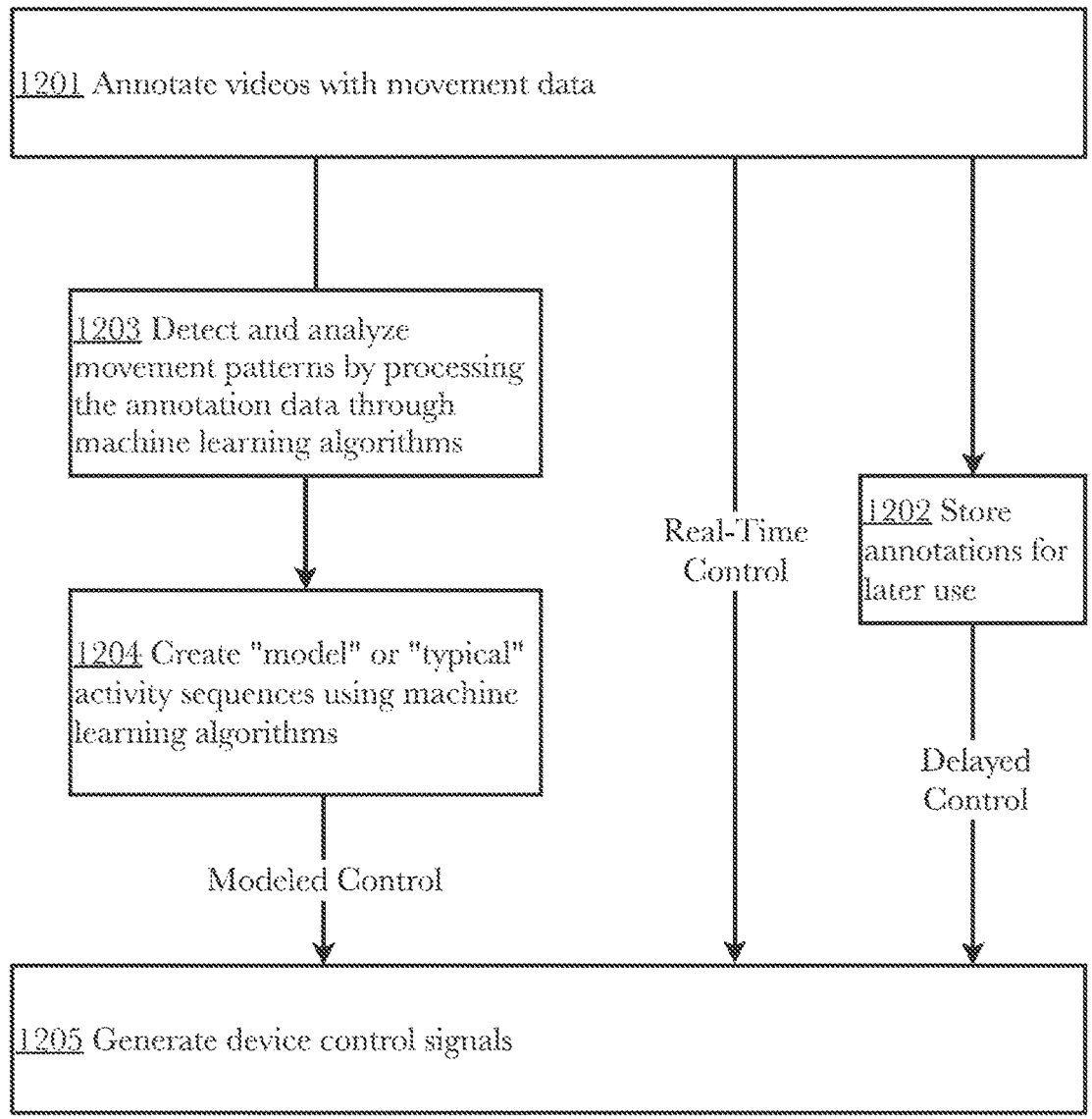
FIG. 12 is a flow diagram showing a method for using annotated video data to control a sexual stimulation device.

FIG. 12 is a flow diagram showing a method for using annotated video data to control a sexual stimulation device. In a first step, videos containing depictions of sexual activity are annotated (or tagged) with data regarding one or more movements shown in the videos 1201. The annotations are associated with playback times in the video, either as metadata incorporated into the video file or as separate files. The annotations (or tags) may be performed manually by a person watching the video or automatically by the video analysis engine 701.

The annotations may be used directly to generate device control signals 1205, such as real-time use wherein the device control signals are generated 1205 immediately or very soon after the annotations are created, or delayed use by storing the annotations for later use 1202 and generating device control signals 1205 from the stored annotations. In this use, the annotations will typically be used to generate control signals for a particular video for which the annotations were made. A single such annotation may be used or some combination of annotations for the same video (e.g., averaging of multiple annotations).

Alternatively, the annotations may be processed through machine learning algorithms to create models of movement patterns and sequences commonly associated with certain videos, or certain sexual activities, persons, etc. In this use, annotations from a plurality of different videos will typically be used. The annotations are processed through a first set of machine learning algorithms to detect and analyze movement patterns typical of certain sexual activities 1203. This first set of machine learning algorithms may use techniques such as clustering to group together similar types of movement patterns. The movement pattern data are then processed through a second set of machine learning algorithms to determine sequencing information 1204 such as how long a pattern is typically held and the probabilities of changing to different patterns after the current pattern. The sequencing information is used to create predictive models of typical or expected sequences of movement patterns, which mimic frequently seen depictions of sexual activity in the annotated data. The data from these models may then be used to generate device control signals 1205 representing movement patterns and sequences in common sexual activities.

Figure 13:
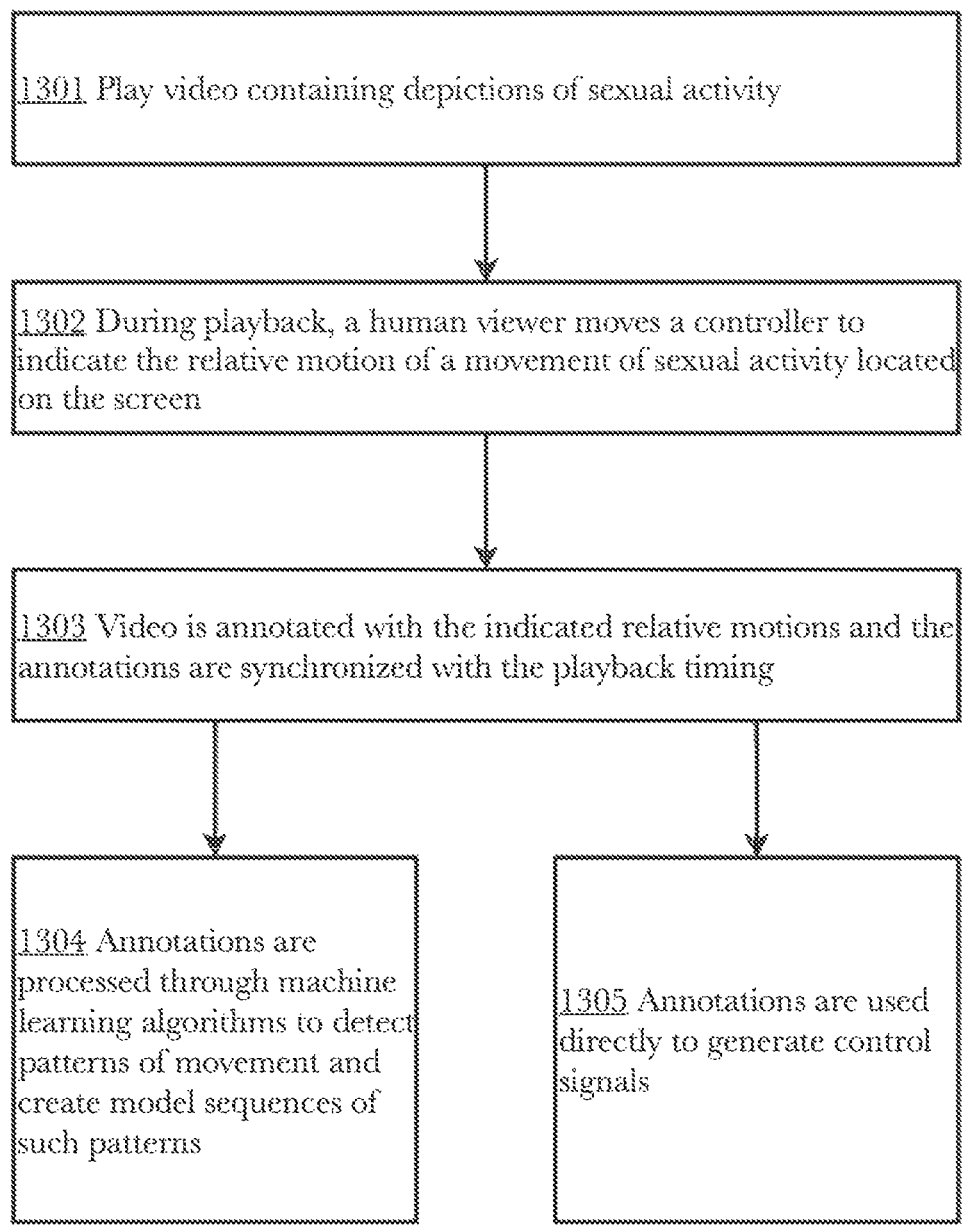
FIG. 13 is a flow diagram showing a method for manual annotation of videos containing depictions of sexual activity.

FIG. 13 is a flow diagram showing a method for manual annotation of videos containing depictions of sexual activity. In a first step, a video is played which contains depictions of sexual activity 1301. During playback, a human viewer moves a controller to indicate the relative motion of a movement of sexual activity located on the screen. The controller may be any device that allows the viewer to input a motion associated with a movement of sexual activity in the video being viewed by the viewer 1302. Ideally, the controller will allow the viewer to simply imitate the motion by mimicking the motion(s) seen in the video (e.g., moving the viewer's hand back and forth) rather than programming in the motion(s) (e.g., by entering a number associated with the motion). The controller may be virtual (e.g., an on-screen slider bar, an on-screen virtual joystick, gestures made in front of a gesture-recognition camera), or the controller may be a physical device (e.g., a physical slider, joystick, wand, mobile phone with an accelerometer, etc.). The controller may allow for linear motions, two-dimensional motions, or three-dimensional motions, and may also allow for rotation or tilting. As the human viewer moves the controller in synchronicity with the movements depicted in the video, annotation data are created that are associated with video playback times 1303. As a simple example, a reciprocal motion depicted in the video may be annotated as tuples, with a series of time stamps representing the video playback time, each associated with a value indicating the relative location of the linear motion in the video at that time. The annotations may be incorporated into the video file as metadata or stored as separate data files. Where the annotations will be used to generate device control data for a particular video, the annotation will typically be associated with the video in some manner. However, where the annotations are to be used as input to machine learning algorithms for generation of models of sexual activity, the annotations may be disassociated with the video from which they are derived. The annotations may then be used to generate control signals 1305, or may be processed through machine learning algorithms to detect patterns of movement and create model sequences of such patterns mimicking the movements of sexual activity associated with certain concepts (e.g., frequently-seen movements represented in a certain type of video, or certain sexual activities, or associated with certain actors and actresses, etc.) 1304.

Figure 14:
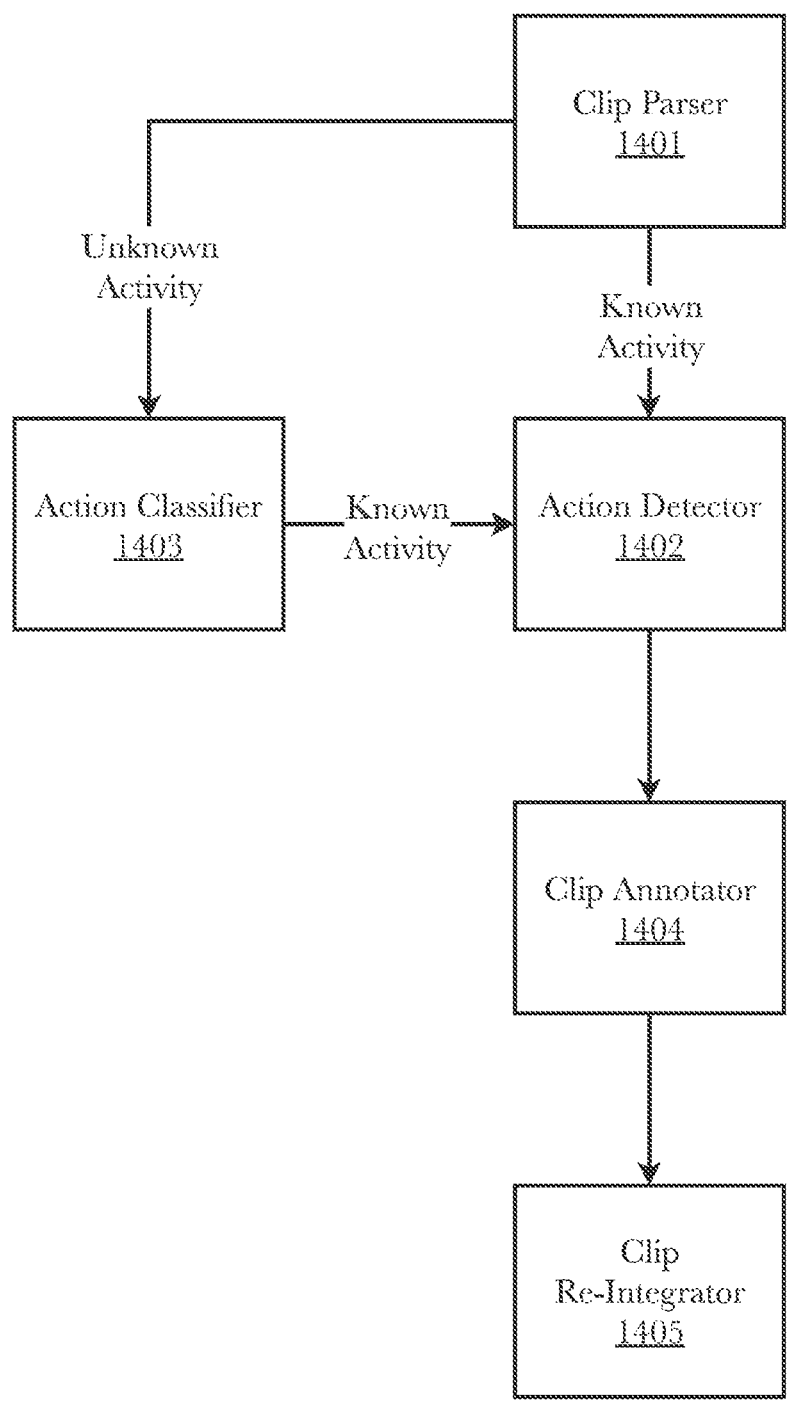
FIG. 14 is a block diagram showing an exemplary system architecture for automated annotation of videos containing depictions of sexual activity.

FIG. 14 is a block diagram showing an exemplary system architecture for automated annotation of videos containing depictions of sexual activity. This exemplary system architecture provides more detail regarding the operation of the video analysis engine 701. In some embodiments, this exemplary system architecture, or a similar one, may be incorporated into the video analysis engine 701 as a component, or as a component of the video parser 801, the metadata processor 803, or the motion translation processor 804. In some embodiments, this system architecture may be distributed among, or substitute for, one or more components of the video analysis engine 701. In some embodiments, this system architecture or it components may exist separately from, but remain accessible to, the video analysis engine 701.

In this exemplary embodiment, a clip parser 1401 parses (i.e., breaks or segments) a video into smaller clips to reduce the scale of the video processing by the machine learning algorithms (i.e., reduces the video to more easily manageable smaller clips of a larger video). Depending on the size of the video, available processing power, and the machine learning algorithm to be used, the clip parser 1401 may reduce the video to any size ranging from the entire video to frame-by-frame clips of the video. Where a video is annotated with known activities (e.g., where the video or segments of the video have been annotated with an indication of the type of activity that is contained therein), the clip parser 1401 may parse the video into clips corresponding to the length of the known activity, as indicated by the annotations. In such cases, the clip parser 1401 forwards the clips of known activity directly to an action detector 1402. Where the video contains depictions of unknown activities, the clip parser will parse the video into uniform sizes (e.g., frame-by-frame, or a certain number of frames representing several seconds or minutes of video), and send the video to an action classifier 1403, which classifies the activities in the video before sending them an known activities to the action detector 1402.

The action classifier 1403 comprises one or more machine learning algorithms that have been trained to classify human actions. Classification of human action is a simpler activity than human action detection. Human action classification involves identification of human objects in the video and some classification of the activity being demonstrated by the human objects (e.g., standing, walking, running, jumping, etc.). Classification does not require a determination of when the action starts, where in the frame the action occurs, or the relative motion of the action; it simply requires that an object in the video be recognized as a person and that the activity of that person be identified.

The action detector 1402 received videos of known sexual activity (i.e., those that have already been classified either manually or using machine learning algorithms), and detects when the action starts, where in the frame the action occurs, or the relative motion of the action. Because the activity in the video is already known, machine learning algorithms may be employed which have been specially-trained for the type of activity depicted in the video. Action detection involves first segmenting the video into objects and backgrounds, identifying human objects in each frame of video, and tracking the movement of those human objects across video frames.

Both action classification and action detection rely on color-based processing of pixels in each frame of the video. Most videos currently available, whether or not depicting sexual activity, are two-dimensional (2D) videos containing color information only (e.g., the RGB color model), from which depth information must be inferred. The addition of depth sensors allows the addition of depth information to the video data (e.g., RGBD color/depth model), which improves human pose estimation but requires specialized sensors that must be used at the time of filming. Due to the processing-intensive nature of analyzing videos using machine learning algorithms, some simplification techniques may be used to reduce the computing power required and/or speed up the processing time. For example, facial recognition algorithms have become widely used, fairly accurate, and can be implemented on computing devices with modest processing power. Thus, for videos where fellatio is known to be the primary sexual activity, facial recognition algorithms may be used as the machine learning component to track the relative position and orientation of the face in the video to indicate the movement component of sexual activity. This greatly reduces the amount of computing power required relative to videos containing unknown sexual activity and/or where whole-body human activity must be classified and detected. As there is a limited range of possible sexual activity, and certain sexual activities are more common than others, specially trained machine learning algorithms can be employed for given types of sexual activity to improve action classification and action detection times and accuracy.

For both action classification and action detection, a variety of machine learning algorithms may be used. For example, as noted above, a convolutional neural network (CNN) may be applied to perform segmentation of each video frame. Other machine learning algorithms or combinations of machine learning algorithms may be employed. For example, a CNN may be employed to extract the features in the video, followed by a long short-term memory (LSTM) algorithm to evaluate the temporal relationships between features. In another example, a three-dimensional CNN (3D CNN) may be employed which can directly create hierarchical representations of spatial and temporal relationships, thus obviating the need to processing through an LSTM. In another example, a two-stream CNN may be used, wherein the first stream of input into the CNN is a set of temporal relationships that are established by a pre-determined set of features, and the second stream is frames from the video. Action classification and/or action detection can be performed by averaging the predictions of the CNN, or by using the output of the CNN for each frame of the video as input to a 3D CNN. Many other variations are possible, and while CNNs are particularly suitable for video processing, other types of machine learning algorithms may be employed.

The clip annotator 1404 associates each video clip with action detection data synchronized with the playback times (or frames) of the video clip, and the clip re-integrator 1405 combines the clips back into the original video received by the clip parser 1401. The annotated video, or just the annotations data from the video, may then be used to generate device control data or may be further processed to extract models of typical sexual activity prior to generating device control data.

Detailed Description of Exemplary Aspects

FIG. 1 shows the internal workings of an exemplary sexual stimulation device 100. The compatible device is a small handheld unit powered by a low voltage, external direct current (DC) power source. Inside the device is a metal framework 101 to which the mechanical parts of the device are attached. Attached to the metal framework 101 is a small DC motor 102 with a motor shaft 103, which drives the stimulation mechanism. A screw shaft 104 is affixed to the motor shaft 103 of the DC motor 102, such that the screw shaft 104 rotates as the motor shaft 103 of the DC motor 102 rotates. The polarity of voltage to the DC motor 102 may be reversed so that the motor shaft 103 of the DC motor 102 rotates both clockwise and counter-clockwise. A flex coupling 105 between the motor shaft 103 of the DC motor 102 and screw shaft 104 compensates for any misalignment between the two during operation. A screw collar 106 is placed around the screw shaft 104 and attached to a bracket 107, which is held in a particular orientation by guide rods 108, such that the screw collar 106 and bracket 107 travel in a linear motion as the screw shaft 104 is turned. Affixed to the bracket 107 is a gripper 109, which travels in a linear motion along with the bracket 107. A hole 110 in the metal framework 101, allows for the insertion of a flexible sleeve as shown in FIG. 2.

Figure 2:
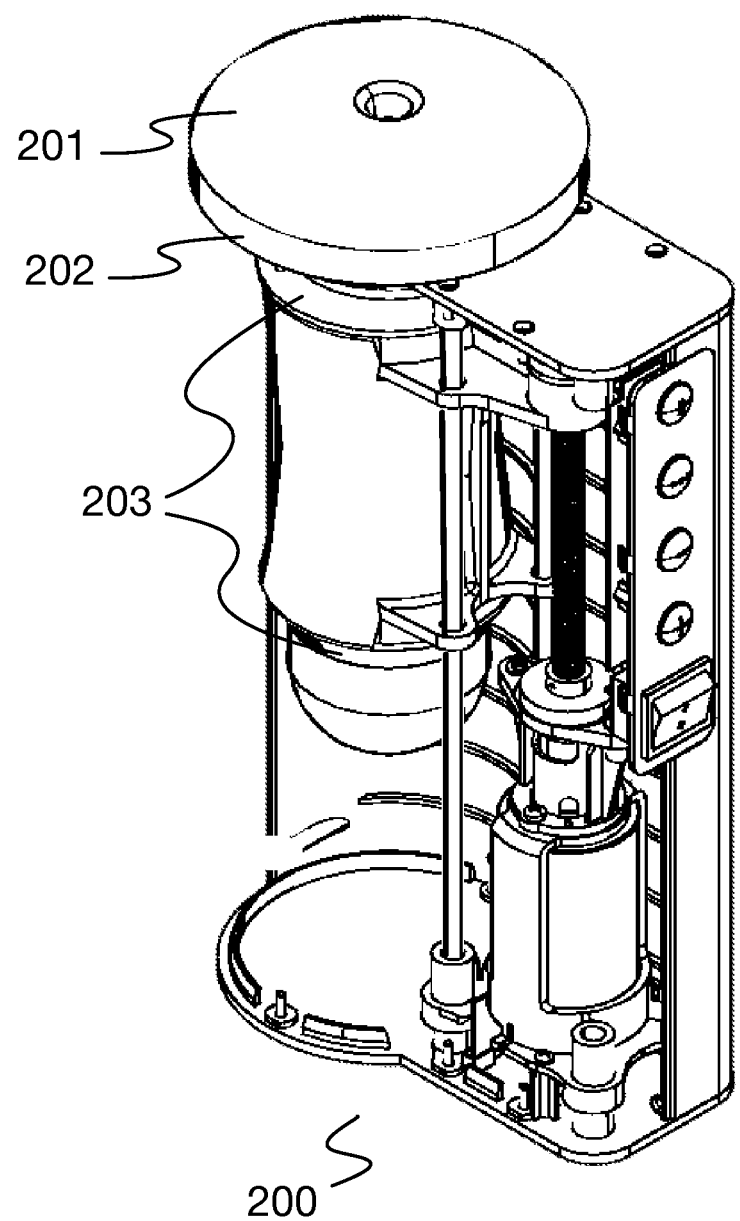
FIG. 2 shows additional components of the internal workings of an exemplary sexual stimulation device.

FIG. 2 shows additional components of the internal workings of an exemplary sexual stimulation device 200. A flexible sleeve 201 made of either thermoplastic elastomer (TPE) or thermoplastic rubber (TPR) is inserted through a large hole 109 in the metal framework 101 and through gripper 108. Sleeve 201 is prevented from accidentally slipping into device 200 by a ridge 202 at the open end of sleeve 201, and is held in the proper position by ridges 203 at both ends of gripper 108. During operation, gripper 108 slides in a reciprocal linear motion 201 providing pressure and motion against the penis inside the sleeve 201 in a manner similar to sexual intercourse or manual masturbation. Depending on the configuration, gripper 108 may either grip sleeve 201 and move sleeve 201 along the penis, or it may slide along the outside of sleeve 201, not moving the sleeve relative to the penis. Also depending on configuration, gripper 108 may be made of rigid, semi-rigid, or compliant materials, and other shapes might be used (e.g., partial tube, ring, half-ring, multiple rings, loops of wire) and may contain rollers or bearings to increase stimulation and reduce friction against the flexible sleeve 201.

Figure 3:
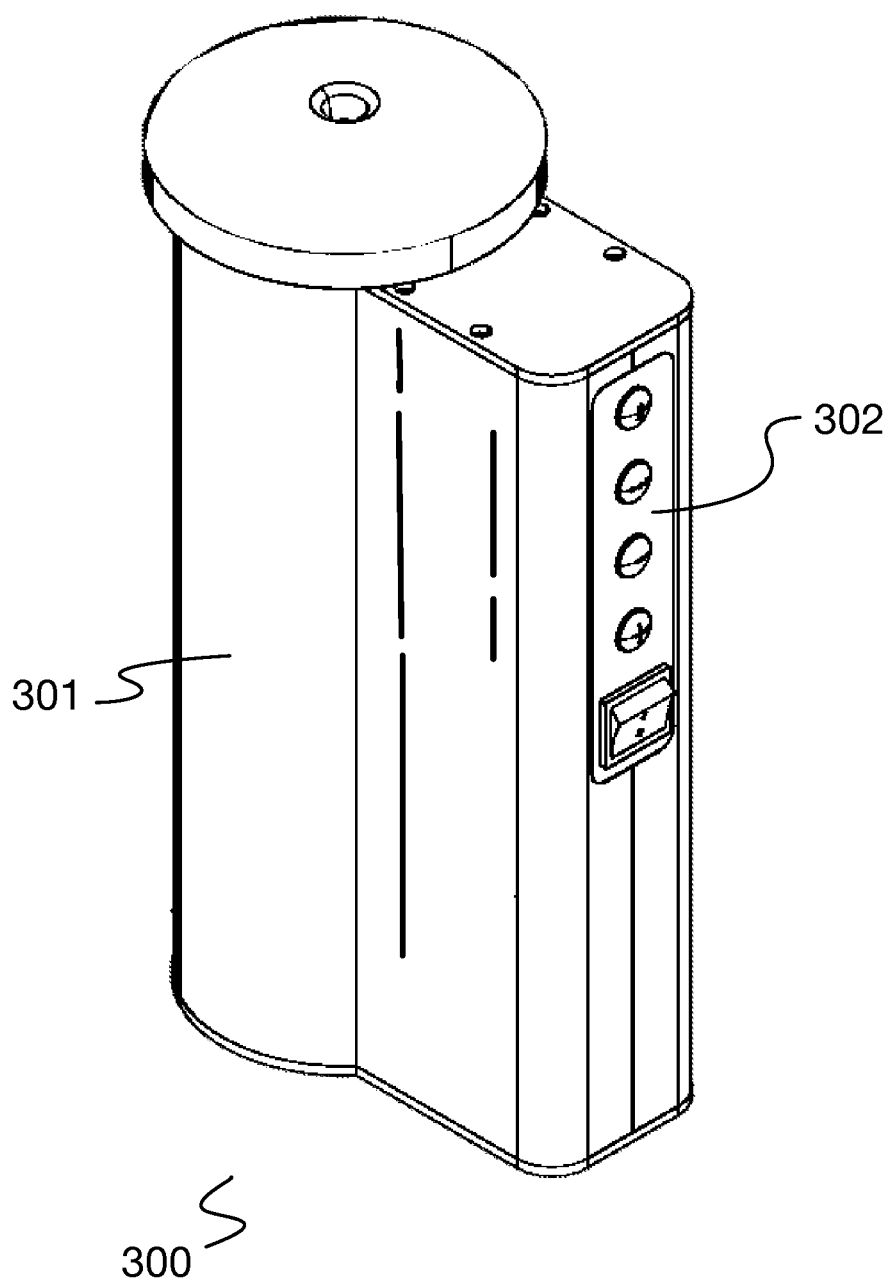
FIG. 3 shows the external structure of an exemplary sexual stimulation device.

FIG. 3 shows the external structure 300 of an exemplary sexual stimulation device. The housing 301 of the device is made of plastic, and is attached to the metal framework in such a way as to provide additional support and structure to the device. User controls 302 in the form of buttons and switches and their associated electronics are built into the housing. The housing has an opening at one end corresponding to the opening 109 in the metal framework 101, into which the flexible sleeve 201 is inserted. The penis is inserted into the sleeve 201 at the end of the device, and is stimulated by the reciprocal linear motion of the gripper 108 inside the device. The user controls the speed, pattern, and location of stimulation using the controls 302 on the outside of the housing 301.

Figure 4:
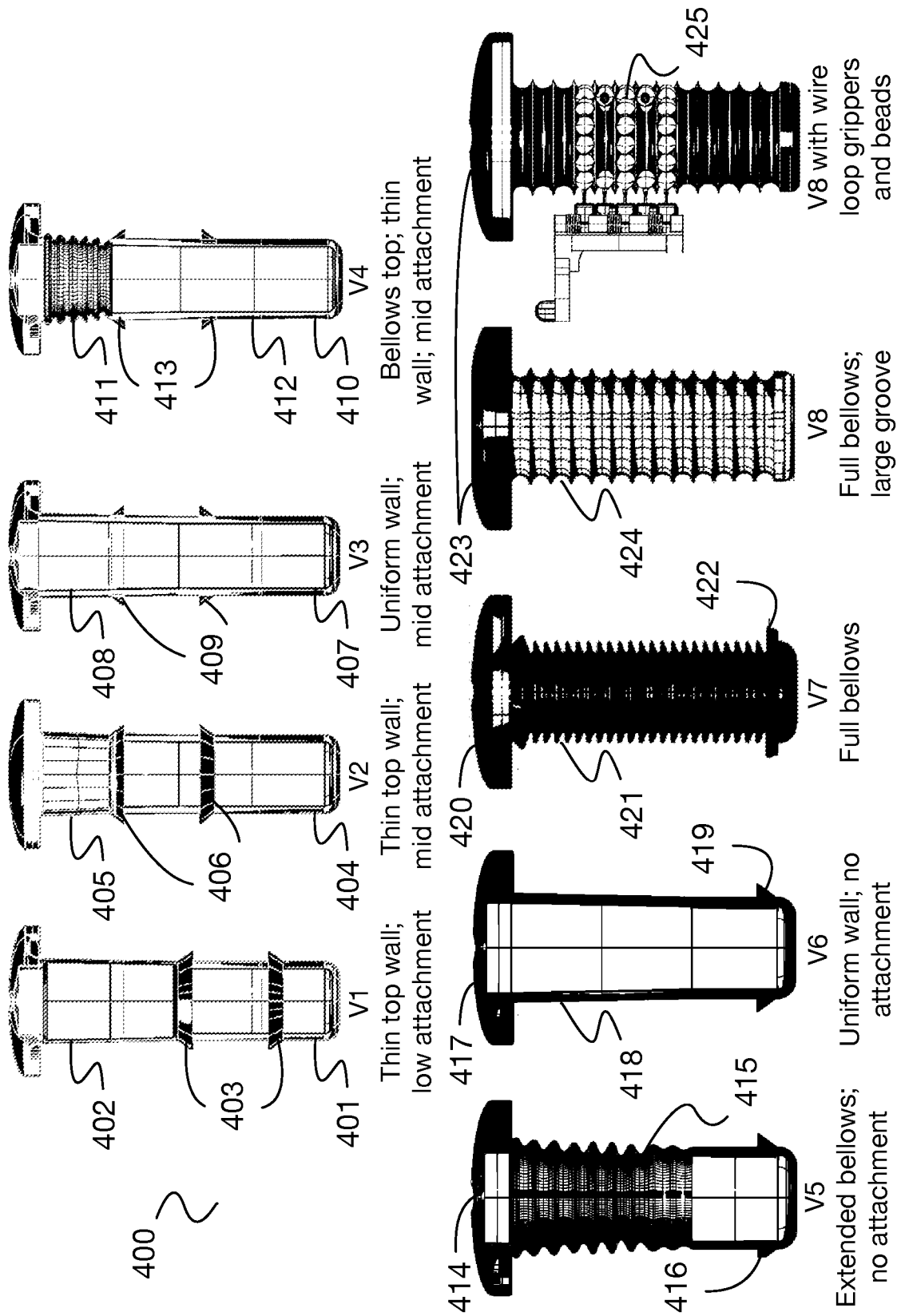
FIG. 4 shows exemplary variations of the sleeve and gripper aspects of an exemplary sexual stimulation device.

FIG. 4 shows exemplary variations 400 of the sleeve 201 and gripper 108 aspects of an exemplary sexual stimulation device. As noted above, different configurations of the sleeve 201 and gripper 108 are possible to allow optimal fit and sensation for penises of different lengths and girths, and to allow the user a choice of pressure, gripper location, and sensation. Sleeve variant one 401 has a thin top wall 402 with a low point of attachment 403 to the gripper 108. Sleeve variant two 404 has a thin top wall 405 with a middle point of attachment 406 to the gripper 108. Sleeve variant three 407 has a uniform wall thickness 408 with a middle point of attachment 409 to the gripper 108. Sleeve variant four 410 has a bellows top 411, a thin wall 412, and a middle point of attachment 413. Sleeve variant five 414 has an extended bellows 415 and no attachment to the gripper 108 other than a stopper at the end 416, allowing the gripper 108 to slide along the outside of the sleeve 414. Sleeve variant six 417 has a uniform wall thickness 418 and no attachment to the gripper 108 other than a stopper at the end 419, allowing the gripper 108 to slide along the outside of the sleeve 417. Sleeve variant seven 420 has a full bellows design 421 and no attachment to the gripper 108 other than a stopper at the end 422, allowing the gripper 108 to slide along the outside of the sleeve 420. Sleeve variant eight 423 has a full bellows design with large grooves 424 into which fits a gripper made of wire loops with beads attached 425.

Figure 5:
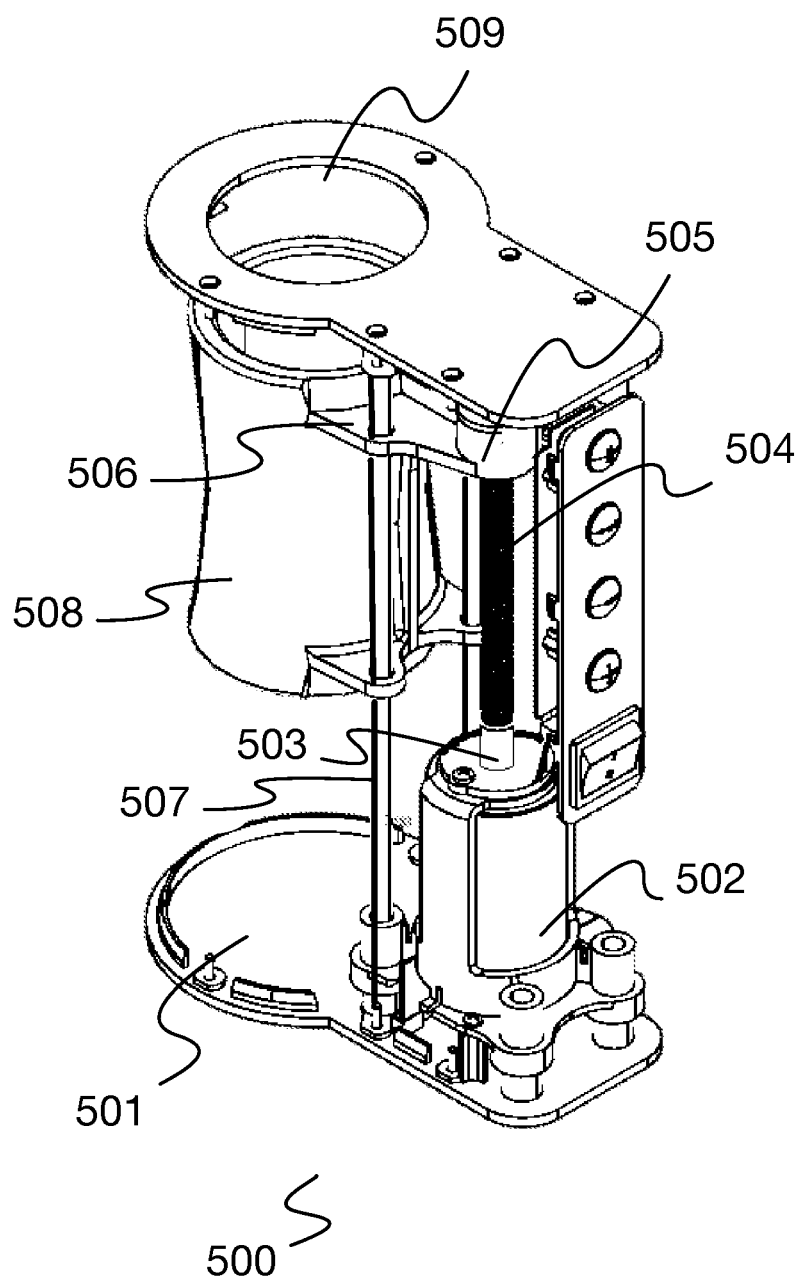
FIG. 5 shows the internal workings of an exemplary sexual stimulation device.
Figure 6:
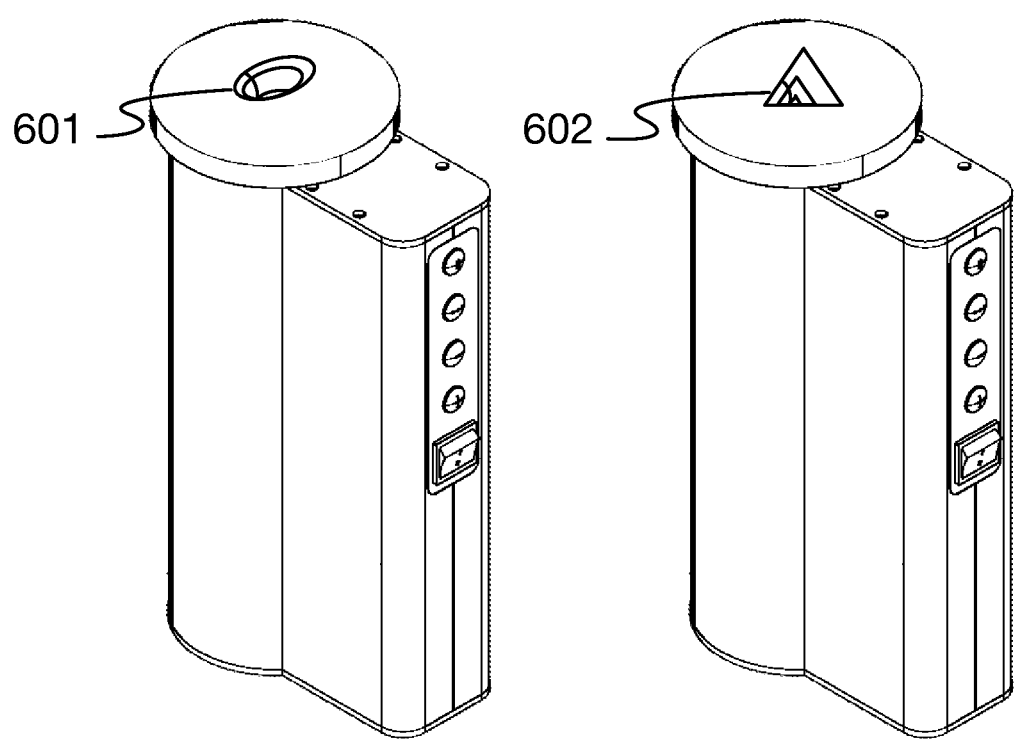
FIG. 6 shows additional exemplary aspects of an exemplary sexual stimulation device.

FIG. 5 shows the internal workings of an exemplary sexual stimulation device 500. The compatible device is a small handheld unit powered by a low voltage, external direct current (DC) power source. Inside the device is a metal framework 501 to which the mechanical parts of the device are attached. Attached to the metal framework 501 is a small DC motor 502 with a motor shaft 503, which drives the stimulation mechanism. A screw shaft 504 is affixed directly to the motor shaft 503 of the DC motor 502, such that the screw shaft 504 rotates as the motor shaft 503 of the DC motor 502 rotates. The polarity of voltage to the DC motor 502 may be reversed so that the motor shaft 503 of the DC motor 502 rotates both clockwise and counter-clockwise. In this embodiment, the flex coupling 105 has been eliminated, allowing the device to be constructed in a more compact form, approximately 2 cm shorter in overall length. A screw collar 505 is placed around the screw shaft 504 and attached to a bracket 506, which is held in a particular orientation by guide rods 507, such that the screw collar 505 and bracket 506 travel in a linear motion as the screw shaft 504 is turned. Affixed to the bracket 506 is a gripper 508, which travels in a linear motion along with the bracket 506. A hole 509 in the metal framework 501, allows for the insertion of a flexible sleeve 201 as previously shown in FIG. 2. FIG. 6 shows additional exemplary variations 600 of the sleeve aspect of an exemplary sexual stimulation device as set forth in another preferred embodiment. In this embodiment, the opening in the sleeve may be other than circular. For example, the opening may be elliptical in shape 601 or triangular in shape 602.

FIG. 6 shows additional exemplary variations of the aspects of an exemplary sexual stimulation device.

Figure 15:
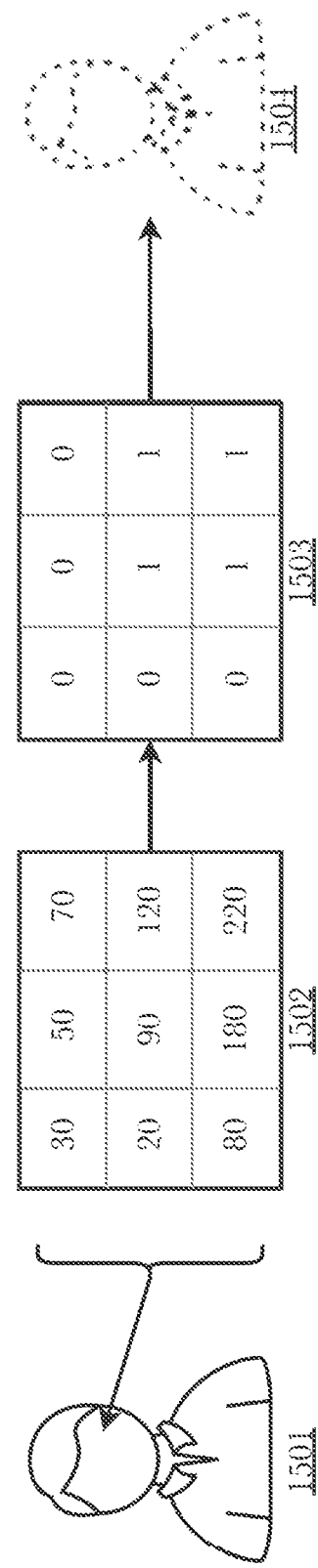
FIG. 15 (PRIOR ART) is a diagram describing the use of the local binary pattern (LBP) algorithm to extract the textural structure of an image for use in object detection.

FIG. 15 (PRIOR ART) is a diagram describing the use of the local binary pattern (LBP) algorithm to extract the textural structure of an image for use in object detection. There are a wide variety of algorithms for extracting data from images and/or video (which is a series of images) for object recognition within the image. The local binary pattern (LBP) algorithm is one of the simplest and easiest to understand, and is therefore used here to demonstrate in general terms how image data is processed to extract certain information. All digital images are composed of pixels, each of which represents the smallest area of viewable information in the image (i.e., each pixel is a "dot" in the image). Each pixel contains information about the color that the dot represents, and the color of the pixel may be either black and white, grayscale, or colored. The representation of the color may be in any number of standard formats (also called color models), with the hexadecimal (HEX), red, green, blue (RBG), and cyan, magenta, yellow, key/black (CMYK) being three of the most common. In this simplified example, the original image 1501 is in 256-bit grayscale, meaning that each pixel in the original image 1501 has a grayscale value of 0-255. The LBP algorithm is applied to each pixel in the original image 1501 by selecting a pixel and comparing the value of that pixel to the value of each surrounding pixel, as shown in the first table of values 1502, in which the selected pixel from the original image 1501 has a value of 90, and the values of the surrounding pixels from top left and going clockwise are 30, 50, 70, 120, 220, 180, 80, and 20. In a next step of the LBP algorithm, for each of the pixels in the first table 1502 is assigned a binary (zero or one) value in a second table 1503, wherein a zero is assigned if the value of the pixel is less than the value of the selected (i.e., center) pixel, and a one is assigned if the value of the pixel is equal to or greater than the value of the selected (i.e., center) pixel. The resulting values are shown in the second table 1503, wherein the pixels with values of 90, 120, 220, and 180 have been assigned a binary value of one, and all of the other pixels have been assigned a value of zero. The values of each of the pixels in the second table 1503 surrounding the selected (i.e., center) pixel are concatenated together in a clockwise manner starting from the top left, resulting in this case in the binary number 00011100. This binary number is then converted back to a decimal number, in this case 28, and this decimal number is substituted in for the value of the selected pixel in the original image 1501, representing a 256-bit grayscale value for the local area in which the selected pixel resides. This process is repeated for all pixels in the original image 1501, resulting in a texturized image 1504 wherein each pixel represents the "texture" of the surrounding pixels from the original image 1501. Many different processing methods can be used on the texturized image to identify features and objects in the texturized image, such division of the image into blocks and extracting histograms of each block, and running the histograms through machine learning algorithms that have been trained to identify features from similar histograms from similar images.

Figure 16:
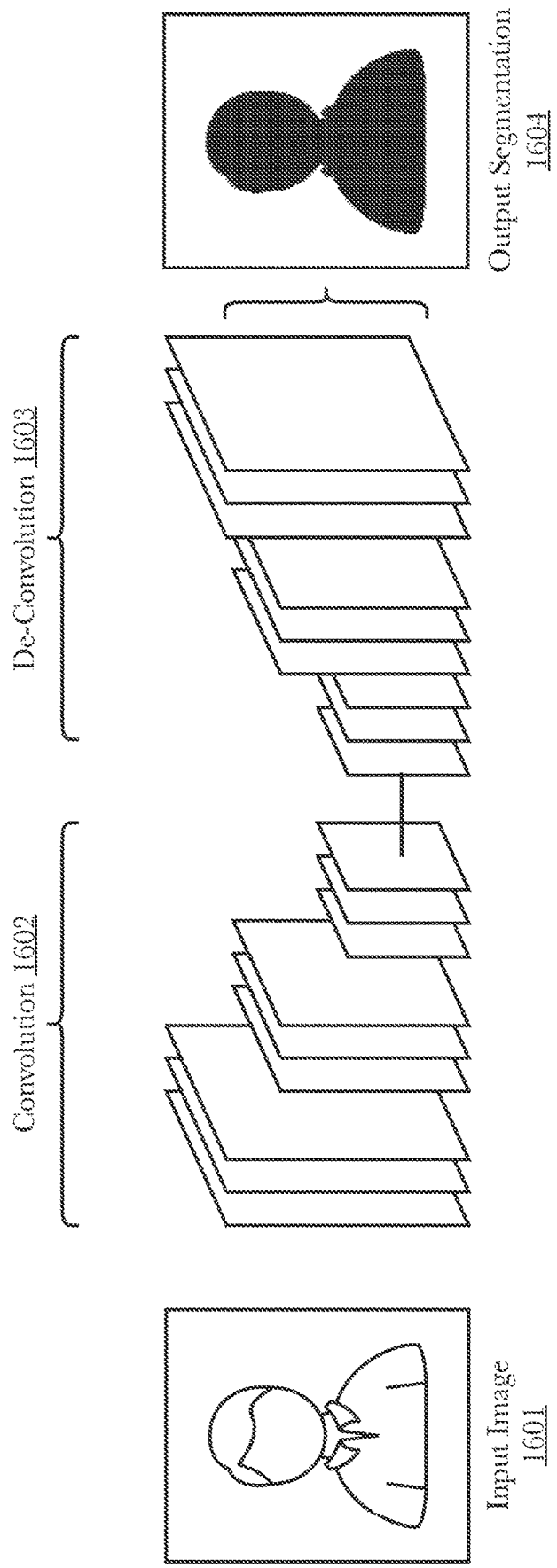
FIG. 16 (PRIOR ART) is a diagram describing the use of a convolutional neural network (CNN) to identify objects in an image by segmenting the objects from the background of the image.

FIG. 16 (PRIOR ART) is a diagram describing the use of a convolutional neural network (CNN) to identify objects in an image by segmenting the objects from the background of the image. Artificial neural networks are computing systems that mimic the function of the biological neural networks that constitute human and animal brains. Artificial neural networks comprise a series of "nodes" which loosely model the neurons in the brain. Each node can pass on a signal to other nodes. The output of each node is some non-linear function of the sum of its inputs, and the probability of a signal being passed to another node depends on the weight assigned to the "edge" between the nodes, which is the connection between the nodes. An artificial neural network finds the correct mathematical relationship between an input and an output by calculating a probability of obtaining the output from the input at each "layer" of mathematical calculations.

Convolutional neural networks are a type of artificial neural network commonly used to analyze imagery that use a mathematical operation called convolution (also called a dot product or cross-correlation) instead of general matrix multiplication as in other types of artificial neural networks. Convolutional neural networks are fully connected, meaning that each node in one layer is connected to every node in the next layer. Each layer of the CNN convolves the input from the previous layer. Each convolutional node processes data only for its receptive field, which is typically a small sub-area of the image (e.g., a 5×5 square of pixels). There may be pooling layers in a CNN which reduce the dimensionality of the data by combining the outputs of node clusters in one layer into a single node in the next layer. Each node in a CNN computes an output value by applying a specific function to the input values coming from the receptive field in the previous layer. The function that is applied to the input values is determined by a vector of weights and a bias. The CNN "learns" by making iterative adjustments to these biases and weights.

In this application of CNNs, an input image 1601 is processed through a CNN in which there are two stages, a convolution stage 1602 and a de-convolution stage 1603, ultimately resulting in an output image 1604 in which objects in the image are segmented (i.e., identified as separate from) the background of the image. In the convolution stage 1602, the image is processed through multiple convolution layers to extract features from the image, and then through a pooling layer to reduce the dimensionality of the data (i.e., aggregation of pixels) for the next round of convolutions. After several rounds of convolution and pooling, the features have been extracted and the data have been reduced to a manageable size. The data are then passed to the de-convolution stage 1603, in which a prediction is made as to whether each pixel or group of pixels represents an object, and passed through several layers of de-convolution before a new prediction is made at a larger level of de-aggregation of the pixels. This process repeats until an output image 1604 is obtained of a similar size as the input image 1601, wherein each pixel of the output image 1604 is labeled with an indication as to whether it represents an object or background.

Figure 17:
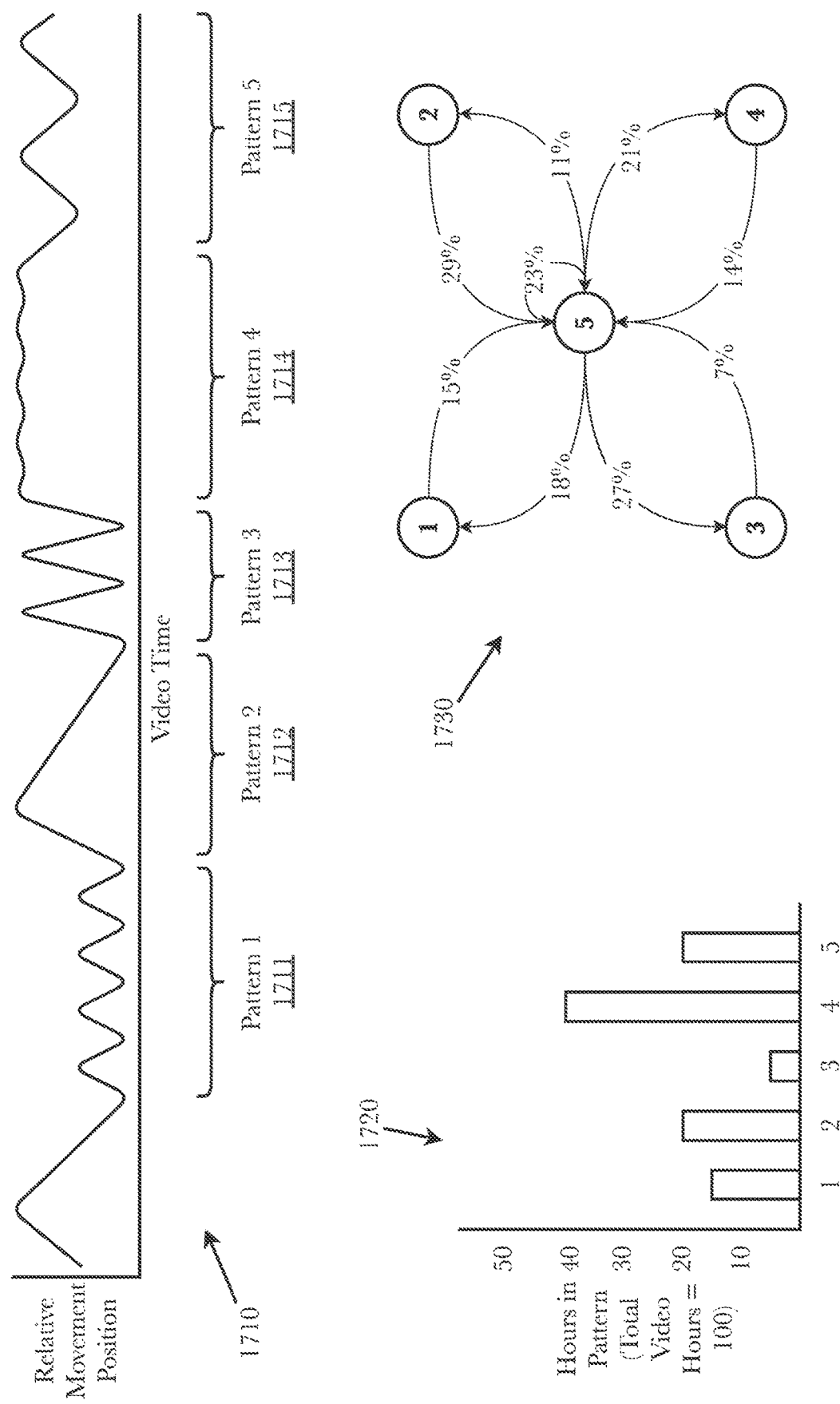
FIG. 17 is a diagram showing exemplary video annotation data collection and processing to develop models of sexual activity sequences.

FIG. 17 is a diagram showing exemplary video annotation data collection and processing to develop models of sexual activity sequences. In a first step, annotation data from videos depicting sexual activity is gathered. The diagram at 1710 shows an exemplary graph created from annotation data from a single video depicting sexual activity. The graph of the annotation data shows the relative position of an object in a single video over time (i.e., movement of the object over time in that video). A number of patterns of movement 1711-1715 can be seen in the graph. When used in conjunction with a single video, the annotation data can be converted directly into device control data for a sexual stimulation device, and the device can be used in synchronization with the video just from the annotation data for that video. However, if models of sexual activity are to be created for use with the sexual stimulation device (e.g., to mimic "typical" sexual activities but without reference to a particular video), additional processing is required to develop models from the annotated data.

To process annotation data to develop models, patterns of movement will ideally be extracted from a larger number of videos. When a machine learning algorithm is fed the annotation data from many such videos, these patterns can be identified across the various videos, and the frequency of these patterns across all videos can be extracted, as shown in the bar chart at 1720. In this bar chart 1720, one hundred total hours of video time was processed through the machine learning algorithm, and the number of hours each pattern of movement 1711-1715 was displayed is shown. For example, Pattern 4 was displayed in a total of 40 hours out of the 100 total hours of video. Machine learning algorithms suitable for this identification of patterns across videos are clustering-type algorithms such as K-means clustering (also known as Lloyd's algorithm), in which movement patterns in the annotation data are clustered into groups containing similar movement patterns. From the clusters, certain types of movement patterns can be identified. For example, in the case of a video depicting fellatio, clusters of movement will show shallow motions around the tip of the penis (e.g., Pattern 4 1714), deep motions around the base of the penis (e.g., Pattern 1), movements along the full length of the penis (e.g., Pattern 3), etc. Such clusters may be visually mapped in 2D or 3D to confirm the consistency and accuracy of the clustering.

Finally, other types of machine learning algorithms may be employed to create models of sexual activity shown in the processed annotation data. In one method, reinforcement learning may be employed to identify the frequency counts of certain patterns of movement, create "states" representing these patterns, and probabilities of transferring from any given state to any other state. An example of such a state diagram is shown at 1730, wherein each state represents one of the patterns of movement 1711-1715, and the lines and percentages indicate the probability of transitioning to a different state. In the diagram at 1730, Pattern 5 1715 is shown as the current state, and probabilities of all possible transitions to and from the current state are shown. In practice, this state diagram 1730 would be expanded to include the probabilities to and from each state to every other state, but this diagram is simplified to show only transitions to and from the current state. From these state transition probabilities, sequences of movement patterns 1711-1715 may be constructed representing models of the "typical" activities shown in the video. If annotation data are processed for selected types of videos (e.g., videos containing certain types of sexual activity, certain actors or actresses, or videos from a certain film studio or director, etc.), the models will be representative of that selected type of video. Alternatively, a wide variety of deep learning algorithms may be used for this process including, but not limited to, dense neural networks, convolutional neural networks, generative adversarial networks, and recurrent neural networks. Each of these types of machine learning algorithms may be employed to identify sequences of the patterns of movement identified in the clustering at the previous stage.

Figure 18:
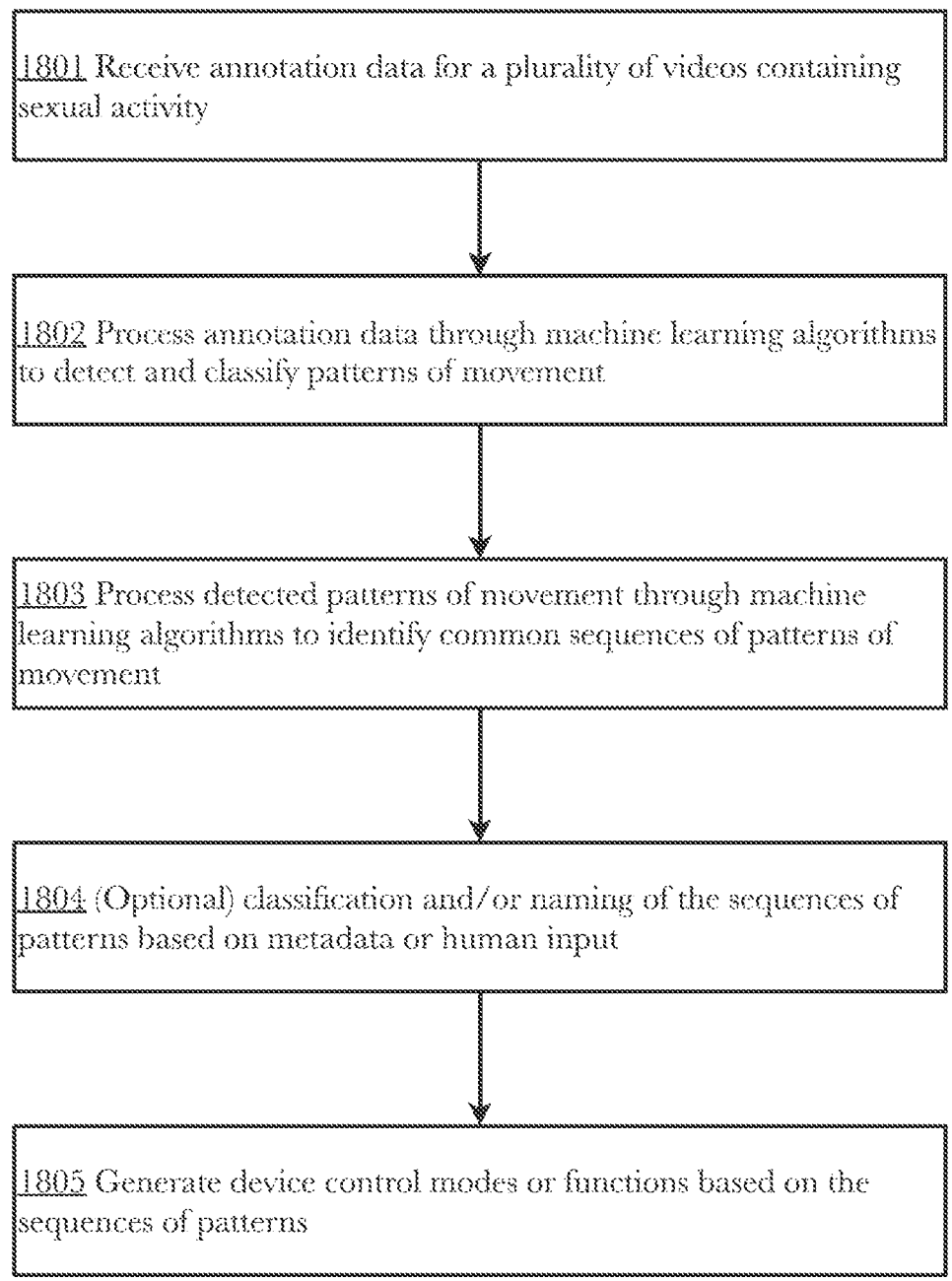
FIG. 18 is a flow diagram showing a method for an exemplary synchronized video control system for sexual stimulation devices.

FIG. 18 is a flow diagram showing a method for developing models of sexual activity sequences from selected videos. In a first step, annotation data are received for a plurality of videos of a particular type (e.g., videos containing certain types of sexual activity, certain actors or actresses, or videos from a certain film studio or director, etc.) 1801. Next, the annotation data are processed machine learning algorithms to detect and classify patterns of movement 1802. Then, the detected patterns of movement are further processed through machine learning algorithms to identify sequences of patterns of movement that are common for that selected type of video 1803, which are then turned into models representative of the types of sexual activity depicted. Optionally, the patterns and sequences of movement may be classified based on metadata associated with the video or based on human input 1804. For example, a particular sequence may be classified as a typical representation of fellatio by a particular adult film star from a certain decade. Lastly, after the models are created, device control modes or functions based on the models may be created 1805 and stored for later use or programmed into the sexual stimulation device.

Figure 19:
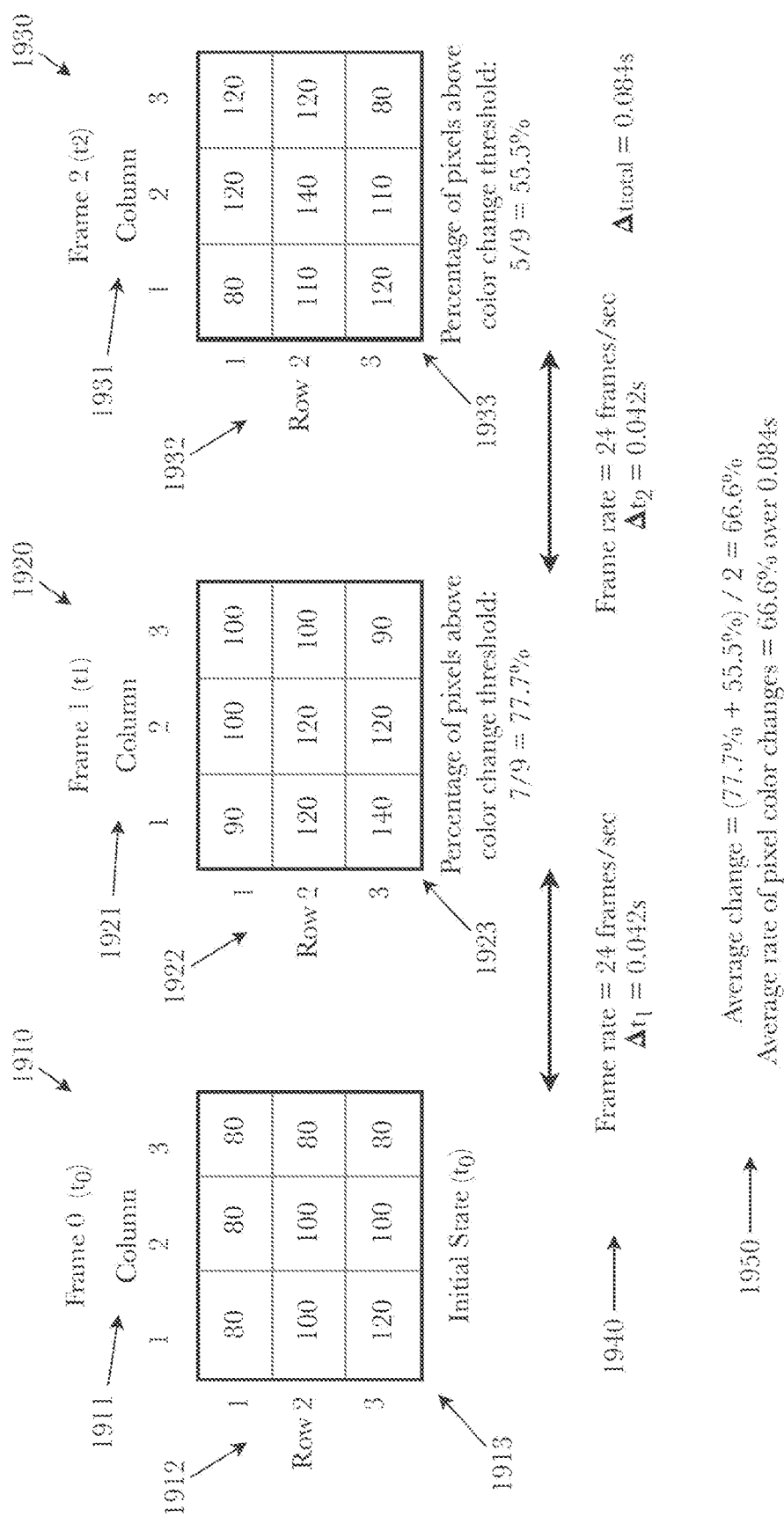
FIG. 19 (PRIOR ART) is a diagram showing an existing method for estimating overall movement in using pixel-by-pixel color change over time.

FIG. 19 (PRIOR ART) is a diagram showing an existing method for estimating overall movement in using pixel-by-pixel color change over time. In this method, the color value of each pixel of each frame of a video is compared with the color values of each pixel of the next frame of the video to determine a color change between the frames, and a color change rate across multiple frames over time. The changes in color act as a proxy for movement allowing estimation of the total "movement" within the video frame-by-frame. This methodology is less determinative than other movement detection methods (because it generally does not detect areas of movement or direction of movement, except as noted below) but is less computationally intensive as a result.

In this example, a simplified pixel color value resolution of 0-255 grayscale shades (8-bit resolution) is used for clarity, but any color value resolutions and scales may be used (as just one such example, 8-bit RGB color with 256 red shades, 256 green shades, and 256 blue shades resulting in 16.77 million colors). Also in this example, a simplified pixel color threshold of 15 is used, but any color value threshold or distance calculation may be used including, for example, the International Commission on Illumination (CIE) algorithms CIE76, CIE94, CIEDE2000, CMC 1:c (1984), each of which are different algorithms for measuring the distance between colors within a color space.

This example shows three arbitrary frames, frame 0 1910, frame 1, 1920, and frame 2 1930, of a video having a frame rate of 24 frames/second (the time difference between frames ($\Delta_t$) being 0.042 s with a $\Delta t_{total}$ of 0.084 s as shown at 1940). Each frame has nine pixels 1913, 1923, 1933, labeled by column 1911, 1921, 1931 and row 1912, 1922, 1932. Frame 0 1910 is an arbitrary initial state (to), with pixel values ranging from 80-120, with higher values in the lower left corner of frame 1913. Frame 1 1920 is the next frame in sequence after frame 0 1910, and has pixel values ranging from 90-140, with the values of all pixels having increased. The values of seven of the nine pixels have increased greater than the color change threshold, meaning that those pixels will be counted as "movement" within the frame. Thus, frame 1 1920 has a color change from frame 0 1910 of 77.7% (7 pixels/9 pixels=77.7%, which is the instantaneous rate of color change between the two frames). Frame 2 1930 is the next frame in sequence after frame 1 1920, and has pixel values ranging from 80-140, with the values of some pixels having increased and some having decreased. The values of five of the nine pixels have exceed the color change threshold (four have increased greater than the color change threshold and 1 has decreased greater than the color change threshold), meaning that those pixels will be counted as "movement" within the frame. Thus, frame 2 1930 has a color change from frame 1 1920 of 55.5% (5 pixels/9 pixels=55.5%, which is the instantaneous rate of color change between the two frames). The average color change across the three frames is 66.6%, and the average rate of pixel color changes is 66.6% over a time difference of 0.084 s ($\Delta t_1 + \Delta t_2 = 0.042\ s + 0.042\ s = 0.084\ s$) as shown at 1950.

Figure 20:
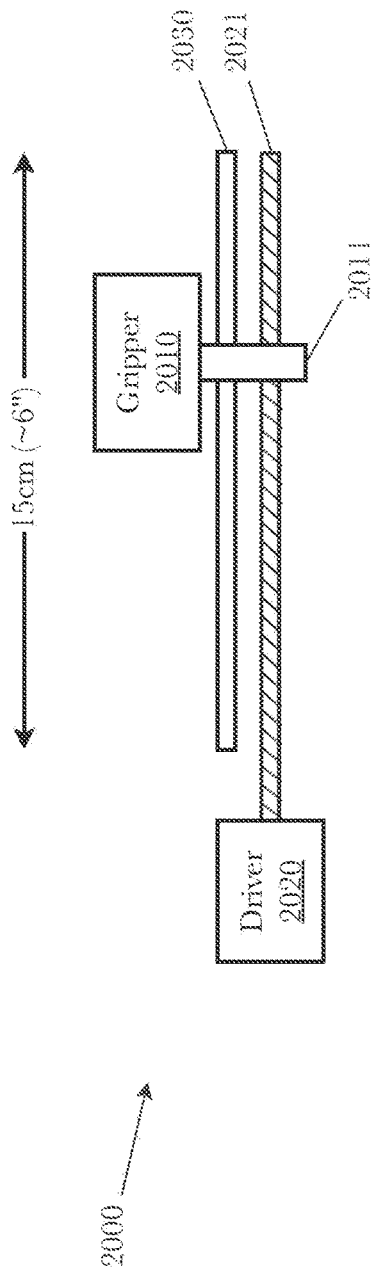
FIG. 20 is a diagram showing an exemplary algorithm for calculating a speed of operation of a sexual stimulation device based on a pixel color change rate.

FIG. 20 is a diagram showing an exemplary algorithm for calculating a speed of operation of a sexual stimulation device based on a pixel color change rate. The movement estimation algorithm described above in FIG. 19 (PRIOR ART) can be used to estimate a "speed" of movement (actually a rate of color change) within the video and applied to control of electromechanical devices such as sexual stimulation devices by calculating a speed of operation of the device from the "speed" of movement in the video. The algorithm herein described above for generation of control signals for sexual stimulation devices based on an overall speed of movement estimate in a video is not only efficient in terms of low processing power requirements, but also in terms of extracting the minimum information from the video required for the purpose of calculating a speed of operation estimate for the sexual stimulation device. By analyzing the entire frame for "motion" in terms of color changes, it is not necessary identify reference points, reference areas, objects, or subjects, within the video. This greatly simplifies the process of movement estimation (and, of course, is part of the reason why processing power requirements are low). This minimal extraction of information from the video is, in many cases, sufficient to calculate an operating speed of a sexual stimulation device, especially where the aspect of the operation of the device is a single variable such as a speed of vibration, speed of motion, or selection from a range of options, modes, or patterns available on the device.

In this example, a simplified diagram of a male sexual stimulation device is shown comprising a gripper device 2010 which is a tubular or annular device into which a male sexual organ may be placed for stimulation, a traveler or carriage 2011 attached to gripper 2010 and configured to ride in a reciprocal linear motion along guide rails 2030, driven by a screw shaft 2021. The traveler/carriage 2011 and its attached gripper 2010 are driven in the reciprocal linear motion by a driver 2020 (in this case an electric motor) and a screw shaft 2021. Reversing of the operation of driver 2020 (in this case by reversing current to the electric motor) causes traveler/carriage 2011 and gripper 2010 to move in the reverse direction of the reciprocal linear motion.

This example assumes a time window of 1 second (24 frames in a video operating at 24 frames per second) for purposes of calculating the "current" rate of pixel color changes, although any time frame may be used. Here, the current rate of pixel color changes is assumed to be 25%, meaning that an average of 25% of the pixels have changed from one frame to the next over the course of one second of video. Assuming that the maximum carriage travel distance is 15 cm and that the maximum carriage travel speed possible using driver 2020 is 60 cm/sec, the current rate of pixel color changes can be applied to operate driver 2020 (and thus move carriage 2011) at ¼ of the maximum speed which is 15 cm/sec ((60 cm*0.25)/sec=15 cm/sec). At this speed, the period of reciprocation of carriage 2011 and gripper 2010 is 2 seconds (15 cm/sec*1 sec*2 directions=2 seconds). This example is not intended to be limiting, and other such calculations or algorithms for determining operation speeds from a rate of pixel change values may be used. Generation of electrical signals to operate driver 2020 from these calculations is as described above.

As noted above, in some embodiments, the algorithm of FIG. 19 (PRIOR ART) could be modified to track areas of movement or direction of movement. One way to do so is to calculate separately areas of pixels that are increasing in color distance from frame to frame and areas of pixels that are decreasing in value from frame to frame and tracking the locations of those areas to determine a direction of motion. Applying these modifications to the example in FIG. 19 (PRIOR ART), for example, this modified algorithm would show that there is movement toward lighter color values from the lower left of the series of frames to the upper right of the series of frames.

Other possible algorithms for estimating a speed of movement in video from pixel color changes include, but are not limited to, tracking of certain colors or ranges of colors (e.g., after identification of those that are moving) to reduce processing power or increase processing speed, mapping of the movements (i.e., pixel locations) of certain colors or groups of colors in addition to their rate(s) of change, tracking of movements in two dimensions or three dimensions instead of just linear or reciprocal movements.

The calculated speed of operation of a sexual device may be a function of the rate of pixel color changes. For example, the calculated speed may be an average of the rates of pixel color changes within a time window, or a weighted function may be applied wherein the more current rates of pixel color changes in a given time window are given greater weight than earlier rates of pixel color changes. In some embodiments, the calculated speed of operation of the sexual stimulation device (and corresponding control signal) may depend on the characteristics of the sexual stimulation device (e.g., as a percentage of the maximum linear speed or maximum period of the device). In some embodiments, the estimation of speed of movement in video may be converted into control signal for a fixed, variable, or incremental setting (e.g., a speed or power level from 1 to 10 on the device) or into a control signal for a mode of operation (e.g., a set of pre-programmed stimulation patterns).

In embodiments where very low processing power is available, the video could be converted to a lower resolution or lower frame rate prior to processing, or down sampled during processing (e.g., calculations only on every $10^{th}$ pixel or every $3^{rd}$ frame).

In some embodiments, a soundtrack from the video could be incorporated into the calculations to improve the motion estimates. For example, an audio analyzer could calculate some function of the soundtrack (e.g., average sound, weighted average sound, sound patterns, etc.) of the video for the same (or similar) time window as for the pixel color change analyses to modify the movement estimate. For example, as the video changes between long shots and close-ups, the proportion of moving objects/subject in the video relative to non-moving background object many change, but the soundtrack may indicate a consistent average volume or consistent sound pattern, suggesting that the motion is unchanged. Calculating a deviation of the sound volume or pattern from the rate of pixel color changes allows for generation of more consistent control signals (e.g., allowing for avoidance of sudden operational speed changes on the device based on perspective changes in the video that conflict with a consistent sound volume or pattern).

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Figure 21:
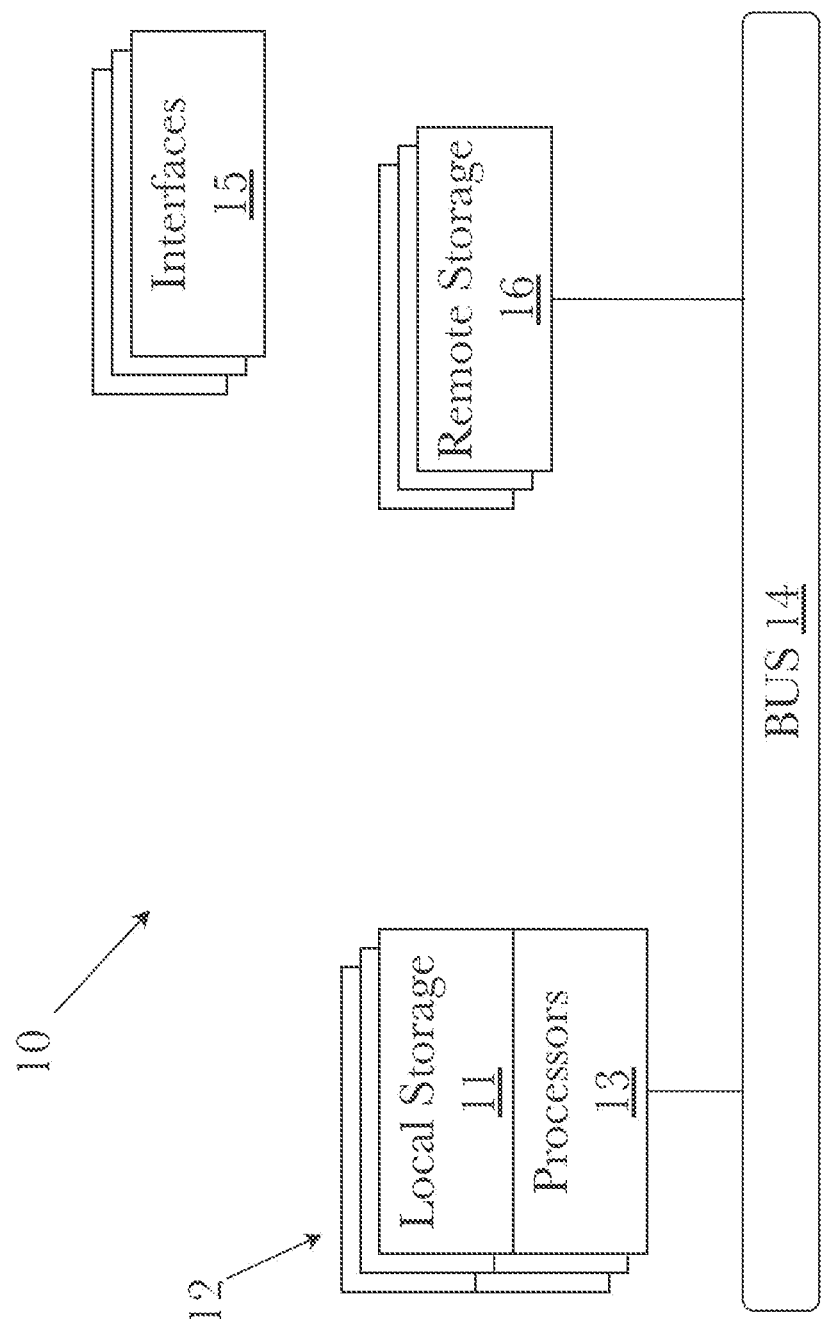
FIG. 21 is a block diagram illustrating an exemplary hardware architecture of a computing device.

Referring now to FIG. 21, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some aspects, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™ THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 21 illustrates one specific architecture for a computing device 10 for implementing one or more of the aspects described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, a single processor 13 handles communications as well as routing computations, while in other aspects a separate dedicated communications processor may be provided. In various aspects, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the aspects described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device aspects may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 22:
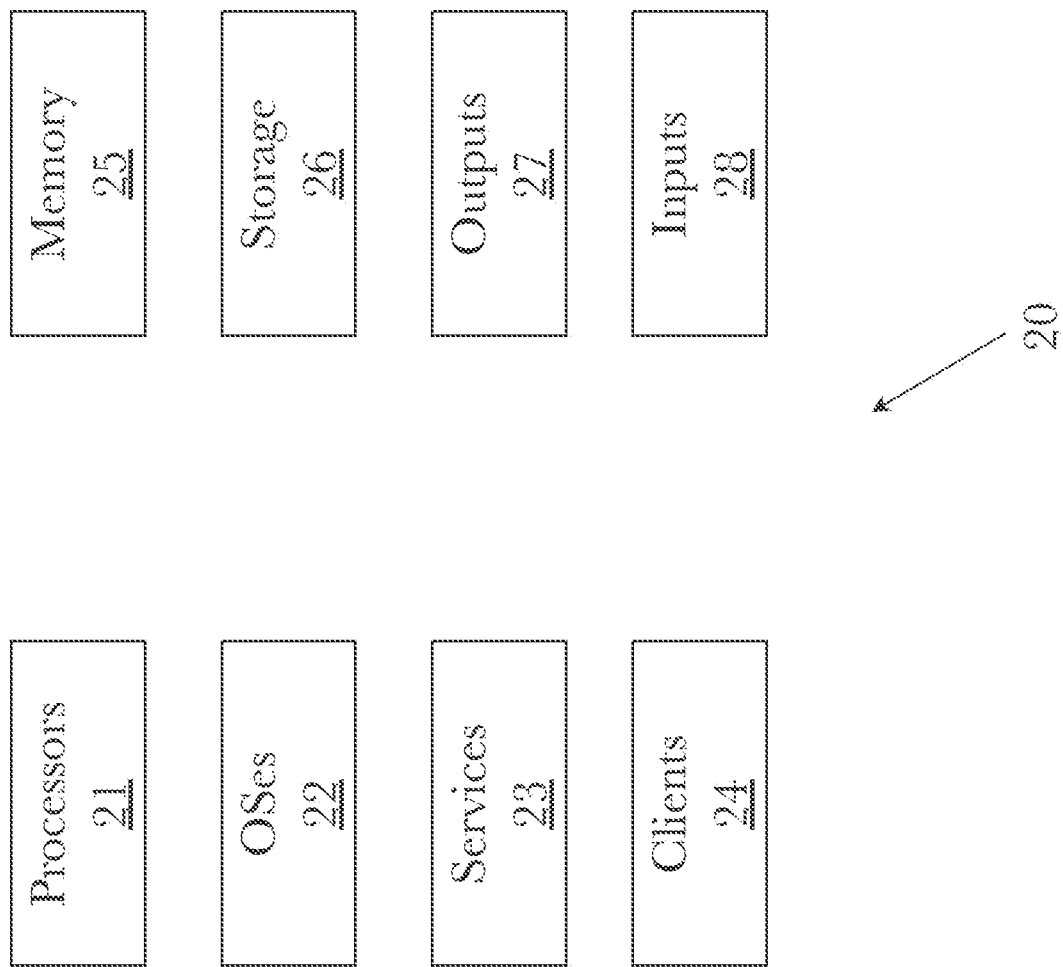
FIG. 22 is a block diagram illustrating an exemplary logical architecture for a client device.

In some aspects, systems may be implemented on a standalone computing system. Referring now to FIG. 22, there is shown a block diagram depicting a typical exemplary architecture of one or more aspects or components thereof on a standalone computing system. Computing device 20 includes processors 21 that may run software that carry out one or more functions or applications of aspects, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 21). Examples of storage devices 26 include flash memory, magnetic hard drive, CD-ROM, and/or the like.

Figure 23:
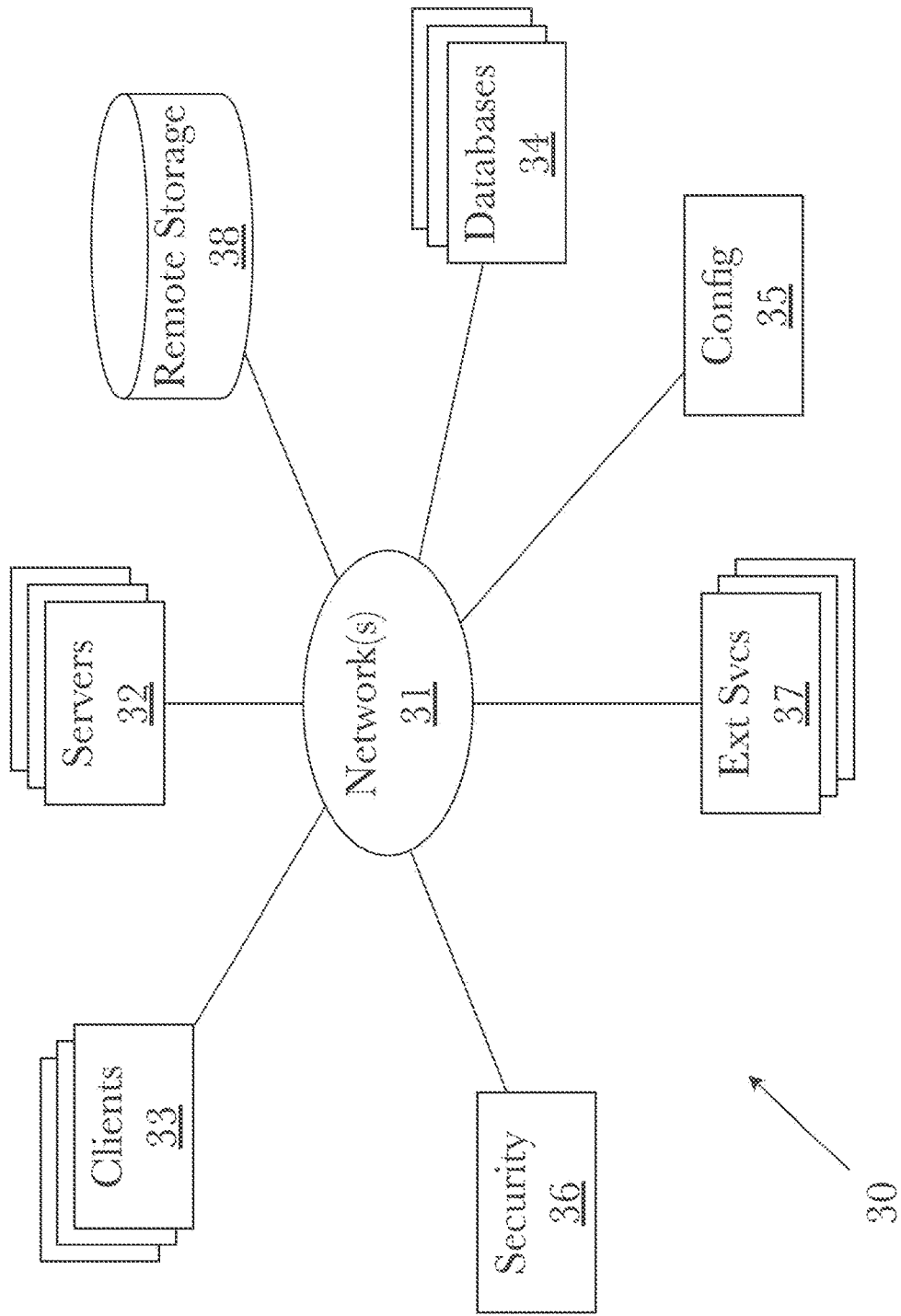
FIG. 23 is a block diagram showing an exemplary architectural arrangement of clients, servers, and external services.

In some aspects, systems may be implemented on a distributed computing network, such as one having any number of clients and/or servers. Referring now to FIG. 23, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 22. In addition, any number of servers 32 may be provided for handling requests received from one or more clients 33. Clients 33 and servers 32 may communicate with one another via one or more electronic networks 31, which may be in various aspects any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some aspects, servers 32 may call external services 37 when needed to obtain additional information, or to refer to additional data concerning a particular call. Communications with external services 37 may take place, for example, via one or more networks 31. In various aspects, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises. In addition to local storage on servers 32, remote storage 38 may be accessible through the network(s) 31.

In some aspects, clients 33 or servers 32 (or both) may make use of one or more specialized services or appliances that may be deployed locally or remotely across one or more networks 31. For example, one or more databases 34 in either local or remote storage 38 may be used or referred to by one or more aspects. It should be understood by one having ordinary skill in the art that databases in storage 34 may be arranged in a wide variety of architectures and using a wide variety of data access and manipulation means. For example, in various aspects one or more databases in storage 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some aspects, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some aspects may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with aspects without limitation, unless a specific security 36 or configuration system 35 or approach is specifically required by the description of any specific aspect.

Figure 24:
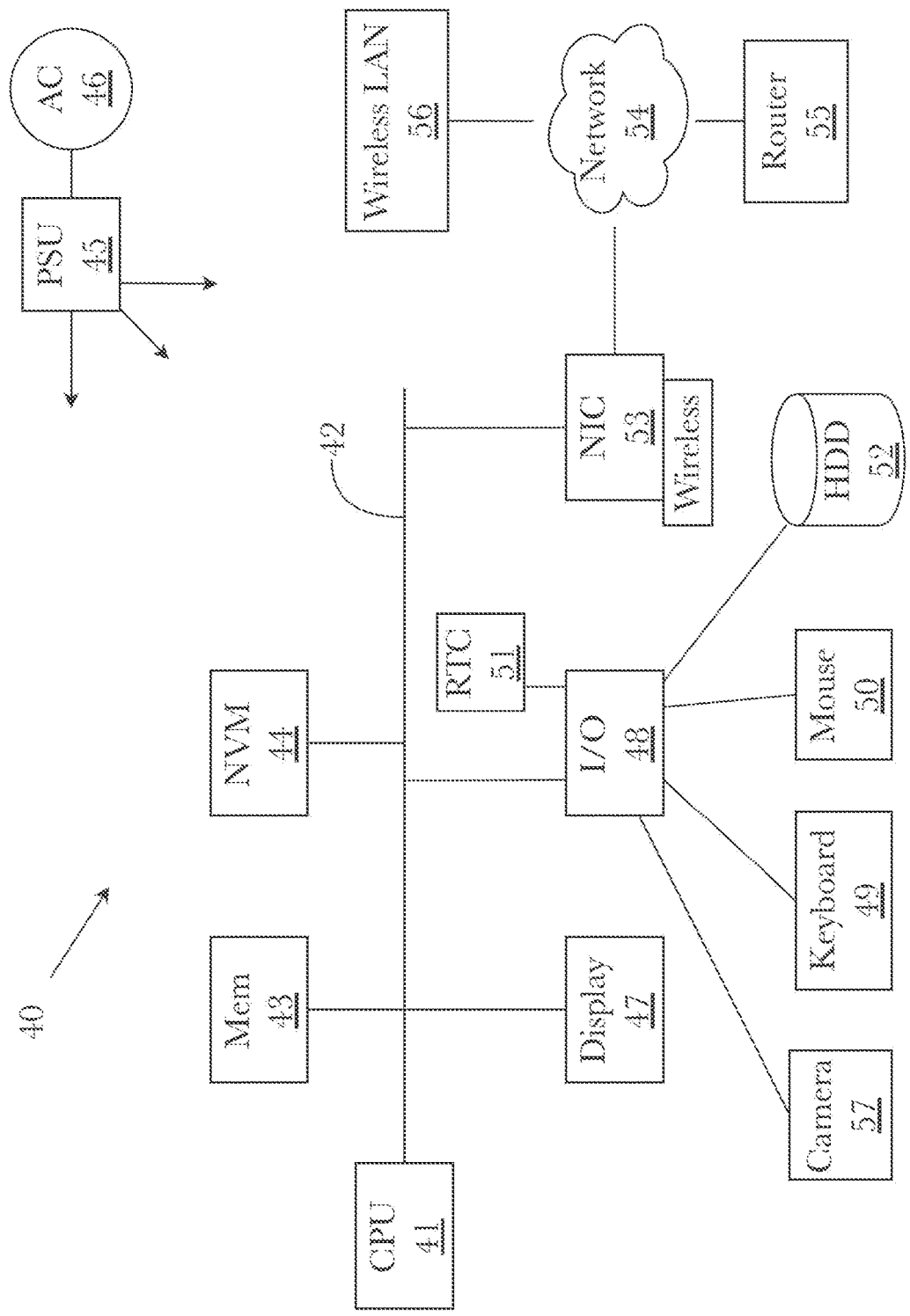
FIG. 24 is another block diagram illustrating an exemplary hardware architecture of a computing device.

FIG. 24 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to peripherals such as a keyboard 49, pointing device 50, hard disk 52, real-time clock 51, a camera 57, and other peripheral devices. NIC 53 connects to network 54, which may be the Internet or a local network, which local network may or may not have connections to the Internet. The system may be connected to other computing devices through the network via a router 55, wireless local area network 56, or any other network connection. Also shown as part of system is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various aspects, functionality for implementing systems or methods of various aspects may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various aspects described above. Accordingly, the present invention is defined by the claims and their equivalents.

What is claimed is:

1. A system for automated generation of control signals for sexual stimulation devices from videos of sexual activity, comprising:
    a computing device comprising a memory and a processor;
    a video analysis engine comprising a first plurality of programming instructions stored in the memory which, when operating on the processor, causes the computing device to:
        determine, for each frame in a sequence of images, a color for each pixel of the frame and for each corresponding pixel of the next frame in the sequence;
        determine a color distance between each pixel of the frame and the corresponding pixel of the next frame in the sequence; and
        calculate a pixel color change percentage as a percentage of the number of pixels in the frame that differ from the corresponding pixels in the next frame;
        estimate a first speed of movement as a function of the pixel color changes over a time window; and
    a control signal generator comprising a second plurality of programming instructions stored in the memory which, when operating on the processor, causes the computing device to generate a control signal for a sexual stimulation device which instructs the sexual stimulation device to operate at a second speed that is calculated based on the first speed and an operational characteristic of the sexual stimulation device.

2. The system of claim 1, wherein a color distance threshold is used to calculate the pixel color change percentage.

3. The system of claim 1, wherein the sequence of images is a video.

4. The system of claim 3, wherein the first speed of movement is associated with movement in the video.

5. A method for automated generation of control signals for sexual stimulation devices from videos of sexual activity, comprising the steps of:
    using a video analysis engine operating on a computing device comprising a memory and a processor to:
        determine, for each frame in a sequence of images, a color for each pixel of the frame and for each corresponding pixel of the next frame in the sequence;
        determine a color distance between each pixel of the frame and the corresponding pixel of the next frame in the sequence; and
        calculate a pixel color change percentage as a percentage of the number of pixels in the frame that differ from the corresponding pixels in the next frame;
        estimate a first speed of movement as a function of the pixel color changes over a time window; and
    using a control signal generator operating on the computing device to generate a control signal for a sexual stimulation device which instructs the sexual stimulation device to operate at a second speed that is calculated based on the first speed and an operational characteristic of the sexual stimulation device.

6. The method of claim 5, wherein a color distance threshold is used to calculate the pixel color change percentage.

7. The method of claim 5, wherein the sequence of images is a video.

8. The method of claim 7, wherein the first speed of movement is associated with movement in the video.

* * * * *